US011231877B2

United States Patent
Tchoub et al.

(10) Patent No.: US 11,231,877 B2
(45) Date of Patent: Jan. 25, 2022

(54) METHOD OF AND DATA STORAGE SYSTEM FOR EXECUTING DISK OPERATIONS

(71) Applicant: YADRO INTERNATIONAL LTD., Nicosia (CY)

(72) Inventors: Ivan Tchoub, St.Petersburg (RU); Alexey Sigaev, Moscow (RU); Artem Ikoev, Moscow (RU); Andrey Fomin, Vsevolozhsk (RU); Nikita Gutsalov, St.Petersburg (RU); Maxim Trusov, Sestroretsk (RU); Mikhail Malygin, St.Petersburg (RU); Sergey Kojushev, St.Petersburg (RU); Vladimir Prikhodko, Pravdinsky District (RU); Alexander Fedorov, St.Petersburg (RU)

(73) Assignee: YADRO INTERNATIONAL LTD., Paphos (CY)

( * ) Notice: Subject to any disclaimer, the term of this patent is extended or adjusted under 35 U.S.C. 154(b) by 99 days.

(21) Appl. No.: 16/666,983

(22) Filed: Oct. 29, 2019

(65) Prior Publication Data
US 2021/0124526 A1   Apr. 29, 2021

(51) Int. Cl.
G06F 3/06    (2006.01)

(52) U.S. Cl.
CPC ............ G06F 3/0659 (2013.01); G06F 3/067 (2013.01); G06F 3/0625 (2013.01); G06F 3/0653 (2013.01); G06F 3/0665 (2013.01)

(58) Field of Classification Search
CPC .... G06F 3/0659; G06F 3/0625; G06F 3/0653; G06F 3/0665; G06F 3/067
See application file for complete search history.

(56) References Cited

U.S. PATENT DOCUMENTS

| 7,234,074 B2 | 6/2007 | Cohn et al. |
| 9,360,925 B2 | 6/2016 | Slik |
| 9,712,897 B2 | 7/2017 | Hirata |
| 11,023,404 B2 | 6/2021 | Kawabe |
| 2008/0201588 A1 | 8/2008 | Pyeon et al. |

(Continued)

OTHER PUBLICATIONS

Notice of Allowance with regard to the U.S. Appl. No. 16/667,003 dated Nov. 29, 2021.

*Primary Examiner* — David Yi
*Assistant Examiner* — Tahilba O Puche
(74) *Attorney, Agent, or Firm* — BCF LLP

(57) ABSTRACT

There is provided a method for executing disk operations in a data storage system (DSS) including a power supply connected to a plurality of serially connected storage enclosures, and a power management module, where each storage enclosure includes at least one disk storage. Each logical partition of plurality of logical partitions is hosted on respective sets of disk storages corresponding to protection groups. The DSS causes activation of a set of protection groups, and authorizes a subset of protection groups to accept execution of disk operations. Disk operations are received and executed by the subset. In response to determining that an operation parameter of a given protection group of the subset is equal to a predetermined threshold, a remaining protection group of the set of protection groups is added to the subset, and a new protection group is activated and added to the set of protection groups.

9 Claims, 14 Drawing Sheets

(56) References Cited

U.S. PATENT DOCUMENTS

| | | | |
|---|---|---|---|
| 2009/0189774 A1* | 7/2009 | Brundridge | H02J 13/00001 340/654 |
| 2012/0151273 A1* | 6/2012 | Ben Or | G06F 11/2205 714/41 |
| 2015/0212910 A1* | 7/2015 | Gondi | G06F 11/2025 714/6.3 |
| 2021/0109664 A1* | 4/2021 | Shang | G06F 3/0647 |

* cited by examiner

METHOD OF AND DATA STORAGE SYSTEM FOR EXECUTING DISK OPERATIONS

FIELD

The present technology relates to data storage systems in general and specifically to a method of and a data storage system for managing execution of disk operations.

BACKGROUND

Object-based storage systems are often used for archiving purposes. As such they can comprise billions, and sometimes trillions of digital objects stored therein. Enterprise high-capacity disk drives are used for storing large volumes of data, as they provide low cost per stored gigabyte of data, while also allowing reasonably fast data retrieval.

When disk-based archive storage systems are scaled to dozens of petabytes and more, factors such as the type of the storage media used, power consumption of the storage system, and physical space occupied by the data storage system contribute to the total cost of ownership (TCO) of the data storage system.

Generally speaking, disk-based storage systems available on the market keep an entirety of their disks powered-on all the time, unless the system is physically detached from the power supplies, or powered-off as a whole. However, in such cases, the system becomes unavailable for client access, and internal data integrity checks (if any).

U.S. Pat. No. 9,360,925 B2 entitled "Power switching technique for archival data storage enclosure", granted on Jun. 7, 2016 and assigned to NetApp Inc teaches a method of power management of a multiple-data-storage-devices enclosure. In some non-limiting embodiments, the method includes: receiving a network connection and power from a data connection port detachably coupled to a network cable; identifying a subset of data storage devices within the enclosure to activate; powering off components within the enclosure other than the subset of the data storage devices; for each data storage device in the subset that is not yet powered, activating the data storage device by: monitoring power consumption drawn from the data connection port; identifying a sequence of components associated with the data storage device, wherein the components within the sequence, when powered, together provide access to the data storage device; and powering on each component in the sequence when a previous component in the sequence has reached a steady state power consumption level, wherein when activating the data storage device, power supplied to power on the sequence of the components does not exceed a total power available from the data connection port.

U.S. Pat. No. 7,234,074 B2 entitled "Multiple disk data storage system for reducing power consumption", granted on Jun. 19, 2007 and assigned to International Business Machines Corp teaches a data storage system in which each of a set of disks has a first portion for either popular data or error correction information (parity or Reed-Solomon code symbols) associated with the popular data, and a second portion used for other data. A disk controller connected to the set of disks maintains a first popular data block in the first portion of a first of the set of disks and a second popular data block in the first portion of a second of the set of disks. The system maintains at least two of the disks in an active state. The active disks are selected to insure that any data in the popular data blocks can be determined from data stored in the active disks. An additional disk is maintained in an active state if write access is permitted or if there is an additional popular data block.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Embodiments of the present technology have been developed based on developers' appreciation that a data storage system that is continuously powered-on allows immediate access to data stored therein, which drives the TCO of the data storage system upwards.

Developer(s) of the present technology have appreciated that in some instances, longer delays for accessing data stored in the data storage system could be tolerated, which could in turn reduce the TCO of the data storage system. In such instances, when access to data is infrequent, and where data may not need to be immediately available to clients, disk storages in the data storage system may not always be required to be powered-on, which could drive down the TCO of the data storage system.

Developer(s) have appreciated that there is a need for a "cold archive" data storage system, where disk storages could be selectively powered-on to serve active client requests, which could save power resources. Such an object-based disk storage system could be configured to operate below a power consumption threshold at any given moment in time.

The present technology allows configuring a power consumption budget available to operate a data storage system. The power consumption budget may be lower than a power consumption budget required for simultaneously powering-on all of the storage disks in the data storage system. The power consumption budget of the data storage system ensures that the data storage system does not exceed a predetermined power consumption threshold.

Generally speaking, the data storage system of the present technology can provide power to activate only a portion of all of the disk storages located inside each storage enclosures, thus lowering total power consumption requirements.

Such a data storage system could comprise a single power supply module, a power management module, and a plurality of serially connected storage enclosures. The power management module could selectively cause the power supply module to provide power to a plurality of serially connected storage enclosures, where each storage enclosure includes a respective set of disk storages. The power management module can provide power to activate only a portion of the respective set of disk storages inside each storage enclosure of the plurality of serially connected storage enclosure, thus lowering total power consumption of the data storage system. Such a data storage system could eliminate the need for individual power supply units inside each storage enclosure, which could lower heat dissipation inside the storage enclosures. In turn, more real estate could be made available in each storage enclosure for installation of disk storages, in contrast with a similar storage enclosure having an individual power supply unit and a wide air cooling channel for example. Such a data storage system could be more power efficient, provide more disk storage space by having more disk storages per square foot, and thus drive down the TCO of the data storage system, while still providing clients with satisfactory data storage services.

The present technology would result in a lower TCO per terabyte, in comparison to some prior art systems available on the market.

Thus, embodiments of the present technology are directed to power management of a data storage system.

In accordance with a first broad aspect of the present technology, there is provided a computer-implemented method for managing execution of disk operations in a data storage system, the data storage system being connected to a storage processor, the storage processor being configured for receiving client requests to execute the disk operations on the data storage system. The data storage system including: a power supply module, a plurality of storage enclosures connected to the power supply module, each storage enclosure of the plurality of storage enclosures including at least one disk storage of a plurality of disk storages, the plurality of disk storages being configured to host a plurality of logical partitions, each logical partition of the plurality of logical partitions being hosted on a respective set of partition disk storages, the respective set of partition disk storages being associated with a respective protection group, each respective protection group being configured to execute the disk operations in response to the respective set of partition disk storages being active, a power management module connected to a power supply module, the power management module being configured to cause activation of the respective set of partition disk storages by selectively causing the power supply module to provide power to an associated storage enclosure, and a processor, the method being executable by the processor of the data storage system, the method comprising: causing activation of a set of protection groups; authorizing a subset of protection groups of the set of protection groups to accept execution of disk operations thereon; receiving, from the storage processor, at least one client request for executing at least one disk operation in the data storage system; transmitting the at least one disk operation to the subset of protection groups, the transmitting causing execution of the at least one disk operation; in response to determining that an operation parameter of a given protection group of the subset of protection groups is equal to a respective predetermined threshold: authorizing a remaining protection group of the set of protection groups to accept execution of disk operations thereon, the authorizing thereby adding the remaining protection group to the subset of protection groups; causing activation of a new protection group of the plurality of protection groups, the activation of the new protection group thereby adding the new protection group to the set of protection groups.

In some implementations of the method, the method further comprises, after the authorizing the remaining protection group of the set of protection groups to accept the execution of the disk operations: causing deactivation of the given protection group, the deactivation of the given protection group thereby removing the given protection group from the set of protection groups.

In some implementations of the method, the method further comprises: receiving, from the storage processor, at least one second client request for executing at least one second disk operation in the data storage system; transmitting the at least one second disk operation to the set of protection groups, the transmitting causing execution of the at least one second disk operation; in response to an operation parameter of another given protection group being equal to the respective predetermined threshold: authorizing the new protection group of the set of protection groups to accept execution of disk operations, the authorizing thereby adding the new protection group to the subset of protection groups; and causing activation of a second new protection group of the plurality of protection groups, the activation of the second new protection group thereby adding the second new protection group to the set of protection groups.

In some implementations of the method, the method further comprises repeating the receiving, the transmitting, and the determining for a plurality of disk operations until a last protection group of the plurality of protection groups is activated and thereby added to the set of protection groups.

In some implementations of the method, the disk operations include write operations; and the operation parameter is an occupied storage space.

In some implementations of the method, the set of protection groups includes a number of N protection groups from the plurality of protection groups; and the subset of protection groups includes a number of N−1 protection groups of the set of protection groups; and each protection group in the subset of protection groups is associated with a respective identifier, the respective identifier being a number from 1 to N−1.

In some implementations of the method, each disk operation is associated with a respective timestamp; and the method further comprises, prior to the transmitting: determining, for each disk operation, based on the respective timestamp, a respective protection group identifier associated with the respective protection group for transmitting the disk operation.

In some implementations of the method, for N−1 initial protection groups in the subset of protection groups, the respective predetermined threshold is a first respective predetermined threshold; and the method further comprises: when the last protection group is authorized to accept write operations: reactivating the given protection group, the given protection group having been previously deactivated in response to its operation parameter being above the first respective predetermined threshold; in response to determining that an operation parameter of the last protection group is equal to the respective predetermined threshold: authorizing the given protection group of the set of protection groups to execute disk operations, the authorizing thereby adding the remaining protection group to the subset of protection groups.

In some implementations of the method, the first respective predetermined threshold is a storage capacity of given protection group multiplied by a ratio of: a number associated with the given protection group to the number of N−1 protection groups in the subset of protections groups.

In some implementations of the method, the number of N protection groups in the set of protection groups is constant for a given moment in time.

In some implementations of the method, the method is executed such that a total write operations power consumption of the set of protection groups is one of: equal to a write operations power consumption threshold of the data storage system for the given moment in time, and below the write operations power consumption threshold of the data storage system for the given moment in time.

In some implementations of the method, the data storage system is configured to execute an object-based storage architecture; and causing execution of a respective write disk operation includes causing storing of a respective object.

In some implementations of the method, the storing the respective object comprises: determining a respective unique object identifier based on the respective timestamp; and the method further comprises, after causing execution of the at least one respective disk operation on the at least one logical partition associated with the given protection group: storing the respective unique object identifier.

In some implementations of the method, the method further comprises receiving a new client request for retrieving a given object, the new client request including the respective unique object identifier of the given object; determining, based on the respective unique object identifier, a respective protection group storing the given object; retrieving, from the respective protection group, the given object; and transmitting the given object.

In some implementations of the method, the method is executed such that a total read operations power consumption is equal to or below a read operations power consumption threshold of the data storage system.

In accordance with another broad aspect of the present technology, there is provided a data storage system connected to a storage processor, the storage processor being configured for receiving client requests to execute the disk operations on the data storage system, the data storage system comprising: a power supply module; a plurality of storage enclosures connected to the power supply module; each storage enclosure of the plurality of storage enclosures including at least one disk storage of a plurality of disk storages, the plurality of disk storages being configured to host a plurality of logical partitions, each logical partition of the plurality of logical partitions being hosted on a respective set of partition disk storages, the respective set of partition disk storages being associated with a respective protection group, each respective protection group being configured to execute the disk operations in response to the respective set of partition disk storages being active, a power management module connected to a power supply module, the power management module being configured to cause activation of the respective set of partition disk storages by selectively causing the power supply module to provide power to an associated storage enclosure; and a processor; a memory including computer-readable instructions; the processor, upon executing the instructions, being configured to: cause activation of a set of protection groups; authorize a subset of protection groups of the set of protection groups to accept execution of disk operations thereon; receive from the storage processor, at least one client request for executing at least one disk operation in the data storage system; transmit the at least one disk operation to the subset of protection groups, the transmitting causing execution of the at least one disk operation; in response to determining that an operation parameter of a given protection group of the subset of protection groups being equal to a respective predetermined threshold: authorize a remaining protection group of the set of protection groups to accept execution of disk operations thereon, the authorizing thereby adding the remaining protection group to the subset of protection groups; cause activation of a new protection group of the plurality of protection groups, the activation of the new protection group thereby adding the new protection group to the set of protection groups.

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
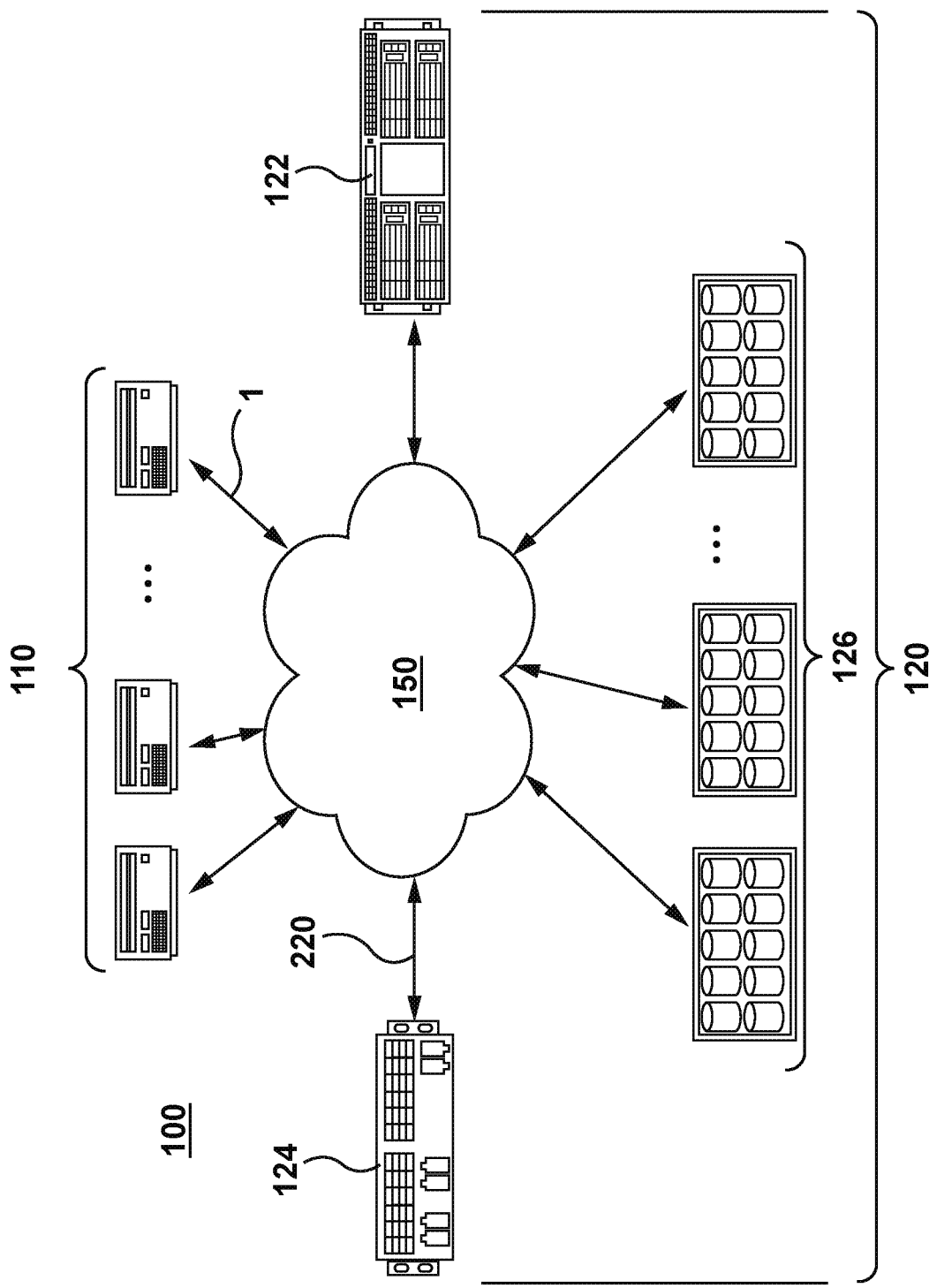
FIG. 1 depicts a schematic diagram of a system in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

System

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured for storing data and retrieving data in response to requests from one or more client devices (not depicted) connected to the system 100 via a client network (not depicted). The nature of the one or more client devices is not limited and, as such, the one or more client devices can include one or more other computer systems, one or more other end client devices, and the like.

Storage Processors

The system 100 comprises one or more storage control processors 110 and a data storage sub-system 120. The one or more storage control processors 110 are coupled to a data transfer and management network 150. Broadly speaking, the purpose of the one or more storage control processors 110 is to interface with the client devices (not depicted) of the system 100 and to distribute received tasks to the data storage sub-system 120, which is functionally responsible for executing the received tasks (such as storing data, retrieving data, and the like). Thus, it can be said, that the one or more storage control processors 110 are configured to execute an interface and a controlling functions, while the data storage sub-system 120 comprises the hardware components that are controlled by and implement tasks assigned by the one or more storage control processors 110.

The one or more storage control processors 110 are connected to the one or more client devices (not depicted) via the client network (not depicted), and to the data storage sub-system 120 via the data transfer and management network 150.

The one or more storage control processors 110, also known as storage controllers, and array controllers, are generally electronic devices having a central processing unit (CPU), a cache memory and connection interfaces with the client network and the data storage sub-system 120. In one non-limiting example, the one or more storage control processors 110 can each be implemented as a Dell™ PowerEdge™ Server running the Microsoft™ Windows Server™ operating system, but can also be implemented in any other suitable hardware, software, and/or firmware, or a combination thereof.

The one or more storage control processors 110 are configured to process incoming client requests from the one or more client devices and distribute them to the data storage sub-system 120 for execution thereby. The client requests may include requests to read data, which client requests are executed by a specific disk storage (not depicted in FIG. 1) in the data storage sub-system 120 as controlled by the one or more storage control processors 110, request to write data, which client requests are executed in a specific disk storage in the data storage sub-system 120 as controlled by the one or more storage control processors 110, requests for configuring storage system resources in the data storage sub-system 120 or a combination thereof.

The one or more storage control processors 110 may receive client requests over the client network (not depicted) via client data packets (not depicted). The one or more storage control processors 110 may transmit responses to the client requests over the client network (not depicted) in the form of response data packets (not depicted).

How the one or more storage control processors 110 are implemented is not limited. As a non-limiting example, the one or more storage control processors 110 may be implemented as any suitable off the shelf server, which has been configured and programmed to execute various routines as disclosed in this description. It is also noted that the server may need to be adapted with certain hardware components, as will be described in greater details herein below (such as respective PLC modems, and the like).

A non-limiting example of the implementation of the one or more storage control processors 110 is SUPERSERVER server available from Super Micro Computer, Inc., 980 Rock Avenue, San Jose, Calif. 95131, United States of America.

It is contemplated that in some non-limiting embodiments of the present technology the one or more storage control processors 110 can receive electrical power from one or more separate power supply units (not depicted).

In alternative non-limiting embodiments of the present technology, the one or more storage control processors 110 may be part of the data storage sub-system 120.

Data Transfer and Management Network

The one or more storage control processors 110 are connected to the data storage sub-system 120 over the data transfer and management network 150

The data transfer and management network 150 may include one or more networks enabling data transfer between components in the system 100, and management of components by other components in the system 100.

As a non-limiting example, the data transfer and management network 150 may include networks such as the Internet, a wide-area communications network, a local-area communications network, and a private communications network using a variety of communication protocols such as transmission control protocol/internet protocol (TCP/IP), packet over synchronous optical networking/synchronous digital hierarchy (SONET/SDH), multiprotocol label switching (MPLS), asynchronous transfer mode (ATM), Ethernet, and the like. As a result, data may be moved between components of the system 100.

In some non-limiting embodiments of the present technology, the data transfer and management network 150 may be implemented as a single network. As a non-limiting example, a single data transfer and management network 150 may be implemented as a PCI express (PCIe) fabric.

In other non-limiting embodiments of the present technology, the data transfer and management network 150 may be implemented as a plurality of distinct networks.

Data Storage Sub-System

The system 100, including the one or more storage control processors 110 and the data storage sub-system 120, is configured to provide the one or more client devices (not depicted) with data storage services. Generally speaking, the data storage sub-system 120 can be implemented as a cold storage system. A cold storage system is a computer system or mode of operation designed for retention of inactive data on a long-term or indefinite basis.

Non-limiting example of uses of the system 100 include data storage services for providing: media asset workflows, health care information archiving, regularity and compliance archiving, scientific data storage, digital preservation, magnetic tape replacement, and the like.

The data storage sub-system 120 comprises a power supply module 122, a power management module 124, and one or more pluralities of storage enclosures 126 connected over the data transfer and management network 150.

How the data storage sub-system 120 is configured from a power transmission perspective will now be described with reference to FIG. 2 and FIG. 3.

Figure 2:
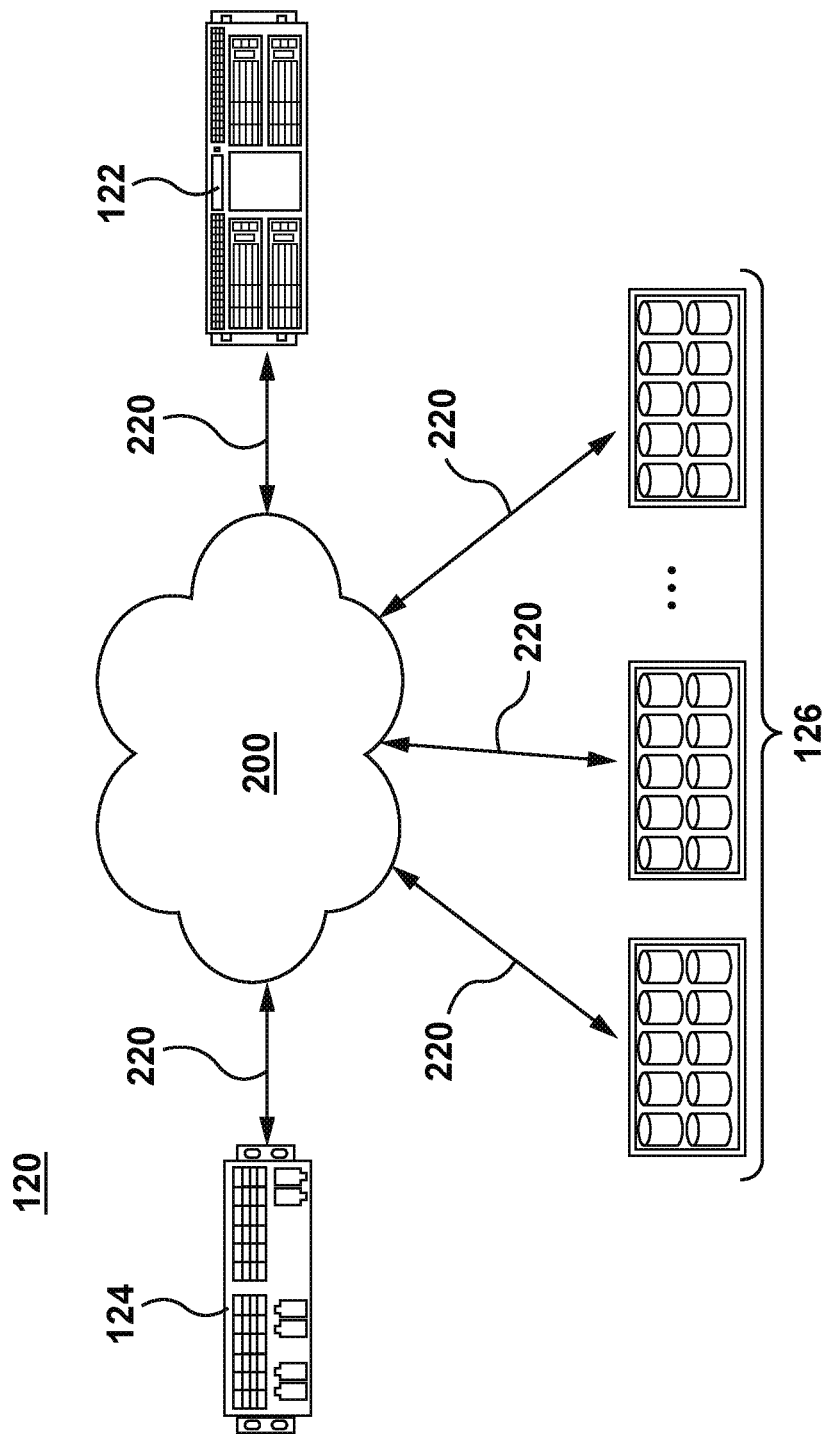
FIGS. 2 and 3 depict a schematic diagram of a power control network within the system of FIG. 1 in accordance with non-limiting embodiments of the present technology.
Figure 3:
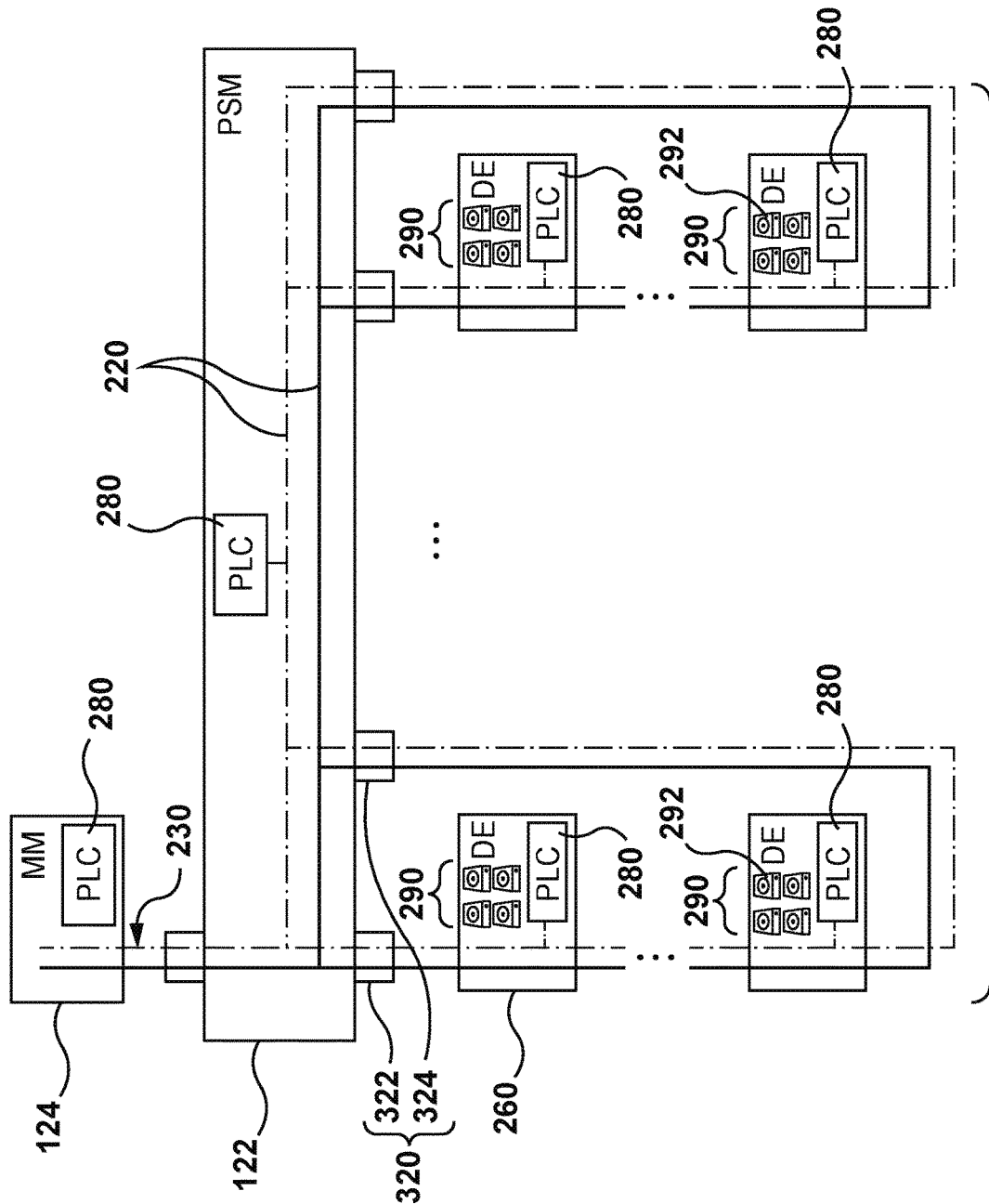

FIG. 2 and FIG. 3 depict, in accordance with non-limiting embodiments of the present technology, a schematic diagram of different components of the data storage sub-system 120 coupled to a power control network 200.

The data storage sub-system 120 comprises the power supply module 122, the power management module 124, and the one or more pluralities of storage enclosures 126 coupled to a power control network 200 via respective power-line cords 220.

Power Control Network

The power control network 200 interconnects each of the power supply module 122, the power management module 124, and each of the one or more pluralities of storage enclosures 126 via the respective power-line cords 220.

The power control network 200 is configured for: (i) transmission of power from the power supply module 122 to the one or more pluralities of storage enclosures 126 via the respective power-line cords 220; and (ii) transmission of power control commands and responses thereto between the power supply module 122, the power management module 124, and the one or more pluralities of storage enclosures 126 via the respective power-line cords 220.

It should be noted that the power control network 200 is physically and logically distinct from other existing networks in the system, such as a wired or wireless network part of the data transfer and management network 150, for example.

The respective power-line cords 220 are configured to transmit both electric power and power control commands via a modulated alternative current (AC) signal. The use of the respective power-line cords 220 for the transmission of both of the electric power and power control commands reduces a number of external cables in the data storage sub-system 120, thereby making maintenance of cables in the data storage sub-system 120 simpler and potentially more cost-effective. It is contemplated that in at least some non-limiting embodiments of the present technology, the use of the respective power-line cords 220 for the transmission of both the electric power and power control commands can simplify maintenance of the data storage sub-system 120. It is further contemplated that in at least some non-limiting embodiments of the present technology, the use of the respective power-line cords 220 for the transmission of both of the electric power and the power control commands can help improve the "density" of the data storage sub-system 120, the density being "storage capacity per square foot" of the data storage sub-system 120.

In the non-limiting embodiment illustrated herein, the respective power-line cords 220 are configured for power-line communication (PLC) on the power control network 200.

Generally speaking, PLC is a communication technology using existing power cables for sending data, which allows simultaneously transmitting electric power and sending data on the existing power cable, e.g. an electronic device may be simultaneously powered-on, be controlled or have data acquired therefrom.

PLC may use different modulation schemes such as Orthogonal Frequency Division Multiplexing (OFDM), Binary Phase Shift Keying (BPSK), Frequency Shift Keying (FSK), Spread-FSK (S-FSK), for example.

In the context of the present technology, PLC allows transmission of electric power and power control commands on the respective power-line cords 220.

The power supply module 122, the power management module 124, and each given storage enclosure 260 of the one or more pluralities of storage enclosures 126 include a respective PLC modem 280. The respective PLC modems 280 are configured transmit and relay power control commands and responses thereto by modulating voltage on the power-line cords 220.

The respective power-line cords 220 are configured to transmit power originating from the power supply module 122 through the data storage sub-system 120. The respective power-line cords 220 connect the power supply module 122, the power management module 124, and the one or more pluralities of storage enclosures 126 to form a power transmission channel.

The respective power-line cords 220 are configured to transmit power control commands through the data storage sub-system 120. The respective power-line cords 220 connect the respective PLC modems 280 of the power supply module 122, the power management module 124, and each given storage enclosure 260 in the one or more pluralities of storage enclosures 126 to form a power control commands channel. The power control commands channel is a shared transmission media, where information is shared from a logical perspective in the data storage sub-system 120. The shared transmission media is a shared bus on the power control network 200, to which the respective PLC modems 280 of the power supply module 122, the power management module 124, and each of the one or more pluralities of storage enclosures 126 are connected. Thus, each of the respective PLC modems 280 has access to the power control commands and the responses to the power control commands transmitted over the power control channel of the source wires (not separately numbered) in the respective power-line cords 220.

It should be noted that a higher-level logic of the power control network 200, as well as power orchestration inside individual components of the power control network 200 can be implemented using commodity microcontrollers with custom firmware and will not be discussed herein in more detail for the purpose of the present specification.

Power Supply Module

The power supply module 122 is configured to provide electric power to activate the one or more pluralities of storage enclosures 126 of the data storage sub-system 120.

How the power supply module 122 is configured to provide power to the one or more pluralities of storage enclosures 126 is not limited, and its implementation is well known in the art. In the embodiment illustrated herein, the power supply module 122 transmits electrical power in the form of a direct current (DC) as an example.

As a non-limiting example, the power supply module 122 can be implemented as a multi-component device including a power supply (such as Scout DC Power System available from Newmar Power of 15272 Newsboy Circle, Huntington Beach, Calif. 92649, United States of America), a PLC-modem (such as RS485 PLC Industrial Modem 220-240V at 50/60 Hz available from Basic Micro of United Kingdom), a controller (such as one available from Raspberry Pi), and communication interfaces (such as an Ethernet port and the like).

The power supply module 122 is under control of the power management module 124, which causes the power supply module 122 to selectively provide power to activate a given storage enclosure 260 of the one or more pluralities of storage enclosures 126.

More specifically, the power supply module 122 has a plurality of output power supply connectors 320 to which the respective power-line cords 220 of each of the one or more pluralities of storage enclosures 126 are connected. The power supply module 122 provides power to each of the storage enclosures 126 via the plurality of output power supply connectors 320 (provided the given one of the plurality of output power supply connectors 320 is activated). Each of the plurality of output power supply connectors 320 can be selectively: switched on to transmit power to a corresponding plurality of storage enclosures of the one or more pluralities of storage enclosures 126, or switched off to stop transmission of power to the corresponding plurality of storage enclosures of the one or more pluralities of storage enclosures 126.

In some non-limiting embodiments of the present technology, the power supply module 122 is located in a separate physical location from at least one of the power management module 124 and the one or more pluralities of storage enclosures 126. In other non-limiting embodiments of the present technology the power supply module 122 may be located in the same physical location as the power management module 124 and the one or more pluralities of storage enclosures 126. In some non-limiting embodiments of the present technology, the power supply module 122 is located physically externally relative to the one or more pluralities of storage enclosures 126. In other words, in some non-limiting embodiments of the present technology, the power supply module 122 is located outside an outer perimeter of the one or more pluralities of storage enclosures 126. In some non-limiting embodiments of the present technology, the physical placement of the power supply module 122 can help improve the "density" of the data storage sub-system 120.

It should be noted that the power supply module 122 can be the only component in the data storage sub-system 120 from where electrical power originates. In alternative non-limiting embodiments of the present technology, it is envisioned that at least some of the various components of the system 100 can have independent and separate power supplied in addition to and similar to the power supply module 122.

Power Management Module

The power management module 124 is configured to control the power supply module 122 to selectively provide power to activate a given plurality of storage enclosures of the one or more pluralities of storage enclosures 126 on the power control network 200 in response to client requests from the one or more storage control processors 110. As a non-limiting example, the one or more storage control processors 110 may request the power management module 124 to activate or deactivate a specific disk storage (not depicted) in a specific enclosure of the one or more pluralities of storage enclosures 126. It is contemplated that in some non-limiting embodiments of the present technology, the power management module 124 may be configured to manage transmission of electric power to disk storages inside the one or more storage enclosures 126 in the data storage sub-system 120.

In some non-limiting embodiments of the present technology, the power management module 124 has a processor (not depicted) connected to a memory (not depicted) for storing computer-readable instructions. As a non-limiting example, the power management module 124 can be implemented as multi-component device including a PLC-modem (such as RS485 PLC Industrial Modem 220-240 Vat 50/60 Hz available from Basic Micro of United Kingdom), a controller (such as one available from Raspberry Pi), and communication interfaces (such as an Ethernet port and the like).

It should be noted that in the embodiment illustrated herein, the power management module 124 receives electrical power from a separate power supply unit (not depicted). However, in alternative non-limiting embodiments of the present technology, the power management module 124 could receive electrical power from the power supply module 122.

In some non-limiting embodiments of the present technology, the power management module 124 has access to the memory (not depicted) for storing and retrieving information about:

the power supply module 122 such as: a number of the plurality of output power supply connectors 320, electric power values such as frequency, voltage supplied from each of the plurality of output power supply connectors 320, and threshold values of electric power that may be supplied via each of the plurality of output power supply connectors 320, and the like.

a given plurality of storage enclosures of the one or more pluralities of storage enclosures 126, such as: addresses of storage enclosures in the given plurality of storage enclosures, electrical power values of the storage enclosures, number of respective disk storages in the storage enclosures, addresses of each of the disk storages in the storage enclosures, type of each disk storage, read or write speed of each disk storage, electric power values of each the disk storages, and the like.

The power management module 124 is connected to a third output power supply connector (not numbered) of the power supply module 122 via a first power-line cord 230 exclusively for communication purposes. The power management module 124 does not consume electrical power from the power supply module 122, and the power supply module 122 is configured to filter out low-frequency harmonics in voltage transmitted to the power management module 124 via the third output power supply connector (not numbered), such that only high-frequency harmonics used for encoding power control commands remain. Thus it can be said that the power management module 124 and the power supply module 122 share an exclusive communication protocol on the power control channel of the first power-line cord 230, which does not require explicit addressing, i.e. no other component of the power control network 200 can accept power control-commands transmitted between the power management module 124 and the power supply module 122.

The power management module 124 is configured to communicate with the one or more pluralities of storage enclosures 126 over the power control network 200 by addressing specifically a given storage enclosure 260 of the one or more pluralities of storage enclosures 126, after execution of an enclosure discovery procedure, which will be described in more detail herein below with reference to FIG. 5.

How the power management module 124 is configured to control the power supply module 122 to selectively provide power to the one or more pluralities of storage enclosures 126 will be described in more detail herein below with reference to FIG. 4.

In the context of the present technology, the power management module 124, under the control of the one or more storage control processors 110, is configured to cause the data storage sub-system 120 to operate below, or equal to, a total power consumption threshold. The total power consumption threshold may be determined by operators of the present technology, for example.

It is contemplated that components of the data storage sub-system 120, such as a number of disk storages in a given storage enclosure and/or a number of the one or more pluralities of storage enclosures 126 may be configured based on the total power consumption threshold.

The total power consumption threshold includes a total power budget such that the disk storage system provides a guaranteed bandwidth for executing client requests for each moment in time.

The total power budget threshold includes a read bandwidth threshold, and a write bandwidth threshold. In other words, the total power budget comprises a portion that is dedicated for the write operations. This can be thought of as a guaranteed (fixed) bandwidth for write tasks (the bandwidths being associated with the speed of executing write tasks). The remainder of the total power budget can be dedicated to read operations.

Storage Enclosures

A given storage enclosure 260 (FIG. 3) of the one or more pluralities of storage enclosures 126 is configured to: (i) receive power originating from the power supply module 122 over the power control network 200, which causes activation of the given storage enclosure 260; (ii) receive power control commands originating from the power management module 124, and transmit responses to the power control commands over the power control network 200; (iii) hold a respective set of disk storages 290; (iv) transmit power to another given storage enclosure (not numbered); (v) provide power to the respective set of disk storages 290; and (vi) execute client requests directed to given disk storage 292 in the respective set of disk storages 290.

It should be noted that all the respective sets of disk storages 290 of the storage enclosures 126 form together a plurality of disk storages. Thus it can be said that data storage sub-system 120 has a plurality of disk storages (not numbered), divided among the storage enclosures 126 in respective sets of disk storages 290.

As stated herein above, electric power in the data storage sub-system 120 originates from the power supply module 122, and the given storage enclosure 260 does not have a respective power supply unit.

The given storage enclosure 260 is configured to receive power to be activated only in response to a sequentially connected storage enclosure being active, i.e. power originating from the power supply module 122 can be transmitted to the given storage enclosure 260 only if all of the prior-sequentially connected storage enclosures is already powered-on, which allows the sequentially connected storage enclosure to relay the power from the power supply module 122 to the given storage enclosure 260. What prior-sequentially connected means will be explained in more detail herein below.

The given storage enclosure 260 is also configured to transmit power originating from the power supply module 122 and destined to another given storage enclosure (not depicted) in the one or more pluralities of storage enclosures 126 upon receiving a request from the power management module 124. To transmit the electric power, the given storage enclosure 260 has an output enclosure connector (not depicted) connected to the respective power-line cord 220 of the other given storage enclosure (not depicted), which can be selectively switched by the power management module 124. The given storage enclosure 260 is the prior-sequentially connected storage enclosure to the other given storage enclosure.

The given storage enclosure 260 is also configured to transmit power to activate the given disk storage 292 of the respective set of disk storages 290 contained in the given storage enclosure 260.

Generally speaking, the given storage enclosure 260 of the one or more pluralities of storage enclosures 126 is a physical chassis structured and dimensioned to receive the respective set of disk storages 290. A number of disk storages contained in the respective set of disk storages 290 is not limited and can be different in various non-limiting embodiments of the present technology.

In some non-limiting embodiments of the present technology, the given storage enclosure 260 includes and operates simultaneously with various types of disk storages in the respective set of disk storages 290.

Disk Storages

The given disk storage 292 in the respective set of disk storages 290 is configured to write and store data, and retrieve stored data contained therein in response to request from the one or more storage control processors 110. The given disk storage is a computer usable information storage medium in the form of a disk adapted to operate in the data storage sub-system 120.

In some non-limiting embodiments of the present technology, the given disk storage 292 may be implemented as a hard disk drive (HDD) including a Serial-Attached SCSI (SAS) HDD, a Serial Advanced Technology Attachment (SATA) HDD, and a Near Line SAS (NL-SAS) HDD. In other non-limiting embodiments of the present technology, the given disk storage 292 may be implemented as a solid-state drive (SDD) including a SAS SSD, and a NVM Express (NVMe) SSD.

Figure 4:
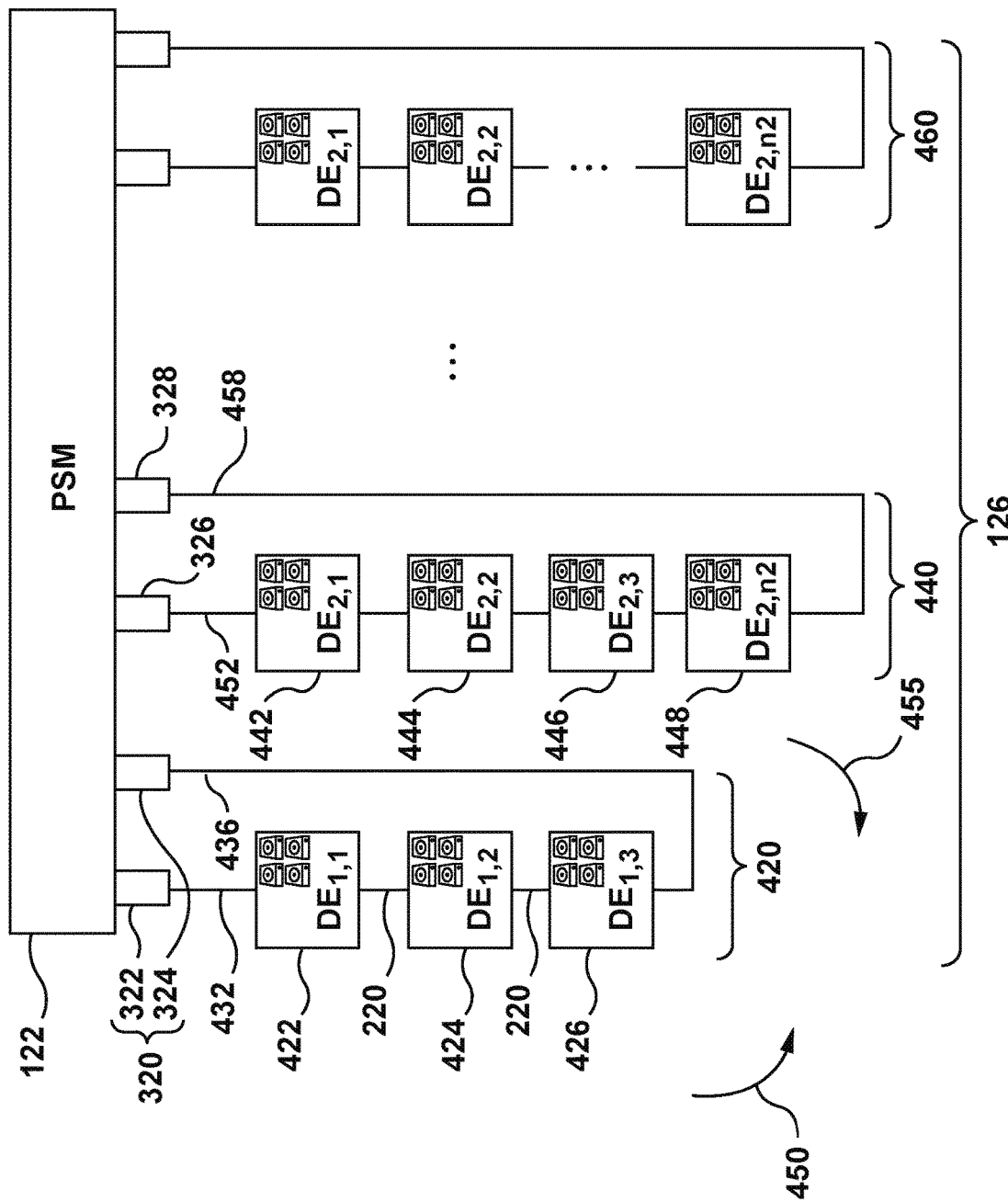
FIG. 4 depicts a schematic representation of a plurality of storage enclosures connected to the power supply module of FIG. 2 in accordance with non-limiting embodiments of the present technology.

Now turning to FIG. 4, there is depicted a schematic diagram of the one or more pluralities of storage enclosures 126 connected to the power supply module 122 in accordance with non-limiting embodiments of the present technology.

The one or more pluralities of storage enclosures 126 include a first plurality of storage enclosures 420, a second plurality of storage enclosures 440, and a third plurality of storage enclosures 460.

It should be noted that one or more pluralities of storage enclosures 126 may be a single plurality of storage enclosures, such as one of the first plurality of storage enclosures 420, the second plurality of storage enclosures 440, and the third plurality of storage enclosures 460.

It should also be noted that in the embodiment illustrated in FIG. 4, a number of storage enclosures in each of the first plurality of storage enclosures 420, the second plurality of storage enclosures 440, and a third plurality of storage enclosures 460 is different for illustrative purposes. It is contemplated that each the first plurality of storage enclosures 420, the second plurality of storage enclosures 440, and a third plurality of storage enclosures 460 may have the same number of storage enclosures, or a different number of storage enclosures, depending on factors such as the total power consumption threshold of the data storage sub-system 120 for example.

How the one or more pluralities of storage enclosures 126 are configured will now be described with reference to the first plurality of storage enclosures 420. It should be understood that the second plurality of storage enclosures 440, and the third plurality of storage enclosures 460 are configured similarly.

Generally speaking, the first plurality of storage enclosures 420 is connected in a daisy-chain arrangement to the plurality of output power supply connectors 320 of the power supply module 122. A daisy-chain arrangement is an arrangement where storage enclosures are connected to each other in series via respective power-line cords 220 to form a loop.

The first plurality of storage enclosures 420 includes a first storage enclosure 422 connected downstream 450 from the power supply module 122, via a first power supply connector 432 that is connected to the first output power supply connector 322 of the power supply module 122. By the same token, a third storage enclosure 426 is connected upstream 455 from the power supply module 122 via a second power supply connector 436 that is connected to the second output power supply connector 324 of the power supply module 122, and a second storage enclosure 424 is connected between the first storage enclosure 422 and the third storage enclosure 426. It can be said that the second storage enclosure 424 is connected downstream 450 from the first storage enclosure 422, or upstream 455 from the third storage enclosure 426.

As used herein, downstream 450 means an anti-clockwise direction in the daisy-chain arrangement, while upstream 455 means a clockwise direction in the daisy-chain arrangement. However, as will be described herein below, it can be said that from the power supply module 122 perspective, the second storage enclosure 424 is connected functionally downstream from both the first storage enclosure 422 and the third storage enclosure 426. Given the daisy-chain arrangement described above, the "functionally downstream" is a term that is used to denote ability to receive electric power supply. In the illustrative example, the second storage enclosure 424 can receive power selectively from either one of (depending on which one is active/not broken): the first storage enclosure 422 and the third storage enclosure 426. It should be also noted that if both the first storage enclosure 422 and the third storage enclosure 426 are active, they form a power loop. In accordance with some of the non-limiting embodiments of the present technology, the technical effect of this arrangement may include fault tolerance in the data storage sub-system 120 by ensuring provision of power to the second storage enclosure 424 if one of the first output power supply connector 322 and the second output power supply connector 324 becomes faulty. By the same token, from the sequential power receiving perspective, the second storage enclosure 424 is connected functionally upstream from both the first storage enclosure 422 and the third storage enclosure 426.

As stated herein above, a given storage enclosure in the first plurality of storage enclosures 420, i.e. the second storage enclosure 424, can only be activated by receiving power originating from the power supply module 122 only if a prior-sequential storage enclosure is active. As should be apparent now, for the second storage enclosure 424, the prior-sequential active storage enclosure can be either the first storage enclosure 422 (in the counter-clockwise direction of power supply) or the third storage enclosure 426 (in the clockwise direction of power supply).

By the same token, the second plurality of storage enclosures 440 are serially connected to form a daisy-chain arrangement, and include four storage enclosures: a first storage enclosure 442 connected downstream from the power supply module 122 via a third power supply connector 452 that is connected to the third output power supply connector 326 of the power supply module 122, a second storage enclosure 444 connected downstream 450 from the first storage enclosure 442, a third storage enclosure 446 connected downstream 450 from second storage enclosure 444, and a fourth storage enclosure 448 connected downstream 450 from the third storage enclosure 446 and connected upstream 455 from the power supply module 122 via a fourth power supply connector 458 that is connected to the fourth output power supply connector 328 of the power supply module 122.

As stated herein above, a given storage enclosure in the second plurality of storage enclosures 440, e.g. one of the second storage enclosure 444 or the third storage enclosure 446, can be activated by receiving power originating from the power supply module 122 only if a prior-sequential storage enclosure connected downstream 450 or upstream 455 is active. As a first non-limiting example, the second storage enclosure 444 can receive power to be activated only if: the first storage enclosure 442 is active, or each of the third storage enclosure 446 and the fourth storage enclosure 448 are active. As a second non-limiting example, the third storage enclosure 446 can receive power to be activated only if: each of the first storage enclosure 442 and the second storage enclosure 444 are active, or if the fourth storage enclosure 448 is active. In other words, a given storage enclosure in a plurality of storage enclosures connected in a daisy-chain can only be activated if all prior-sequential storage enclosures (i.e. up to the power supply module 122) downstream 450 from or upstream 455 from the given storage enclosure are active.

Figure 5:
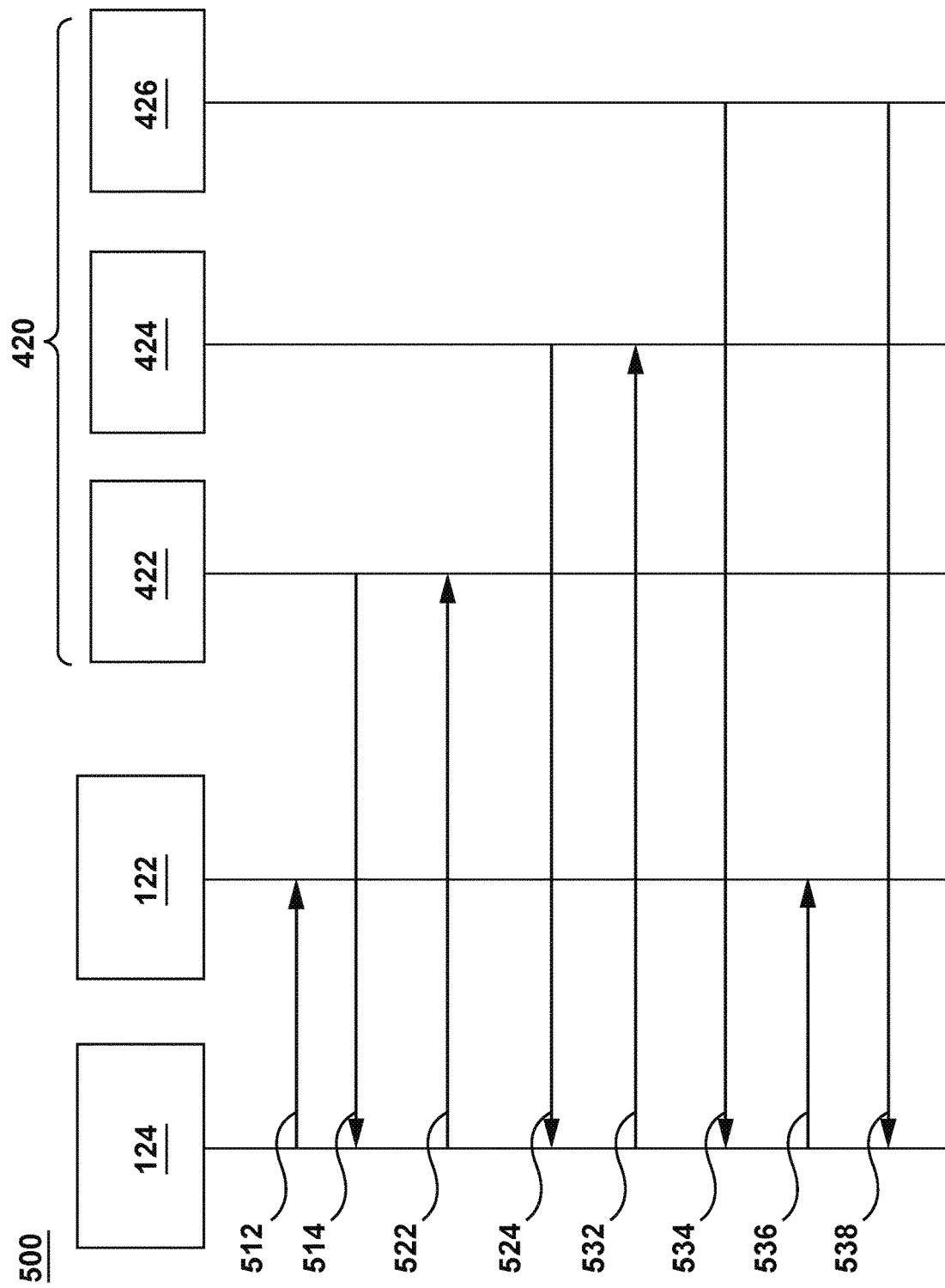
FIG. 5 depicts a schematic diagram of a communication flow of an enclosure discovery procedure in accordance with non-limiting embodiments of the present technology.

Now turning to FIG. 5, there is depicted a diagram of a communication flow of an enclosure discovery procedure 500 in accordance with non-limiting embodiments of the present technology.

The communication flow of the enclosure discovery procedure 500 is depicted from the point of view of the power control commands channel.

Enclosure Discovery Procedure

The enclosure discovery procedure 500 is executed by the power management module 124 upon initialization or re-initialization of the data storage sub-system 120.

In some non-limiting embodiments of the present technology, the power management module 124 has access to computer readable instructions in a memory, the computer-readable instructions, upon being executed cause the processor (not depicted) of the power management module 124 to execute the enclosure discovery procedure 500.

The purpose of the enclosure discovery procedure 500 is to: (i) acquire configuration data of the data storage sub-system 120; (ii) validate that a current configuration of the data storage sub-system 120 matches the acquired configuration data; and (iii) assign logical addresses to components of the data storage sub-system 120.

As stated herein above, the power management module 124 has access to a volatile or non-volatile memory for retrieving information about resources that must be available to the data storage sub-system 120.

The power management module 124 transmits a first power control command 512 via the first power-line cord 230 to the power supply module 122 to switch on the first output power supply connector 322, the first output power supply connector 322 being connected to the respective power-line cord 220 of the first plurality of storage enclosures 420. The first power control command 512 causes the power supply module 122 to provide electric power to the first storage enclosure 422.

The first storage enclosure 422 receives the electric power and is activated. In response to the first power control command 512, the first storage enclosure 422 transmits a first response power control command 514 to the power management module 124 to confirm it has been activated.

The power management module 124 receives the first response power control command 514 and assigns a first enclosure address to the first storage enclosure 422.

The power management module 124 transmits a second power control command 522 to the first storage enclosure 422 using the first enclosure address to activate the second storage enclosure 424 of the first plurality of storage enclosures 420.

The second storage enclosure 424 receives the electric power via the first storage enclosure 422 and is activated. The second storage enclosure 424 transmits a second response power control command 524 to the power management module 124 to confirm it has been activated.

The power management module 124 receives the second response power control command 524 and assigns a second enclosure address to the second storage enclosure 424.

The power management module 124 transmits a third power control command 532 to the second storage enclosure 424 via the first storage enclosure 422 using the second enclosure address to activate the third storage enclosure 426 of the first plurality of storage enclosures 420.

The third storage enclosure 426 receives the electric power via the first storage enclosure 422 and the second storage enclosure 424 and is activated. The third storage enclosure 426 transmits a third response power control command 534 to the power management module 124.

The power management module 124 receives the third response power control command 534 and assigns a third enclosure address to the third storage enclosure 426.

The power management module 124 can now communicate directly with each of the first storage enclosure 422, the second storage enclosure 424 and the third storage enclosure 426 of the first plurality of storage enclosures 420 by using the first enclosure address, the second enclosure address, and the third enclosure address respectively on the power control commands channel of the respective power-line cords 220.

In some non-limiting embodiments of the present technology, the power management module 124 transmits a fourth power control command 536 to the power supply module 122 to switch on the second output power supply connector 324. The third storage enclosure 426 may respond with fourth response power control command 538, which confirms operation of the second output power supply connector 324.

The second output power supply connector 324 safeguards the first plurality of storage enclosures in case of failure of the first output power supply connector 322.

The power management module 124 repeats the procedure with the second plurality of storage enclosures 440, and the third plurality of storage enclosures 460.

In some non-limiting embodiments of the present technology, the enclosure discovery procedure 500 may be implemented by the following pseudocode executed by the power management module 124:

```
1.  // PSM: power supply module, MM: power management module
2.  Read from the configuration data of the data storage system the following
    parameters:
        • the expected number of the plurality of output power supply module
        • (PSM) connectors
            for each expected connector read whether a daisy chain of enclosures is
            expected on that connector; if yes, read the expected number of enclosures
            in that chain
3.  Compose a list of output PSM connectors that are expected to have enclosures
    attached to them: connectors_list
4.  for each connector in connectors_list:
5.      PSM_power_on_connector(connector)
6.      is_received = wait_for_response_from_enclosure(time_to_wait)
7.      if is_received == false:
8.          Discovered configuration doesn't match the description
            The discovery process failed
9.      address = get_enclosure_free_address( )
10.     ENCLOSURE_assign_address(address)
11.     found_next_enclosure = true
12.     while found_next_enclosure == true
13.         found_next_enclosure = false
14.         ENCLOSURE_power_on_next(address)
15.         is_received =
    wait_for_response_from_the_enclosure(time_to_wait)
16.         if is_received == false:
17.             if we expected the response:
18.                 Discovered configuration doesn't match the
            description
                    The discovery process failed
19.         else:
20.             if we didn't expect the response:
21.                 Discovered configuration doesn't match the
            description
                    The discovery process failed
```

```
22.      found_next_enclosure = true
23.      address = get_enclosure_free_address( )
24.      ENCLOSURE_assign_address(address)
25.
26.   Using the configuration description, calculate address of a redundant
   connector for the  current daisy chain of enclosures: redundant_connector
27.      PSM_power_on_connector(redundant_connector)
```

Thus, the enclosure discovery procedure 500 may be executed by using the four interfaces implemented by the power supply module 122, the power management module 124, and the one or more pluralities of storage enclosures 126, where PSM_power_on_connector(connector)—request the PSM to power-on an output PSM connector whose address is given in the connector argument wait_for_response_from_enclosure(time_to_wait)—listen the power control channel 'bus' for a time_to_wait period of time or until a "powered-on" notification is received. Return 'true' if the notification was received. Return 'false' in the opposite case ENCLOSURE_assign_address(address)—a command that can be sent by MM to the power control network. Any enclosure that is listening to the power control channel 'bus' and doesn't have an address assigned should learn that from now on it has address as its address in the power control network. When MM sends this command, it expects that exactly one enclosure waits for the address to be assigned ENCLOSURE_power_on_next(address)—a command intended for an enclosure whose address is address. The corresponding enclosure should switch-on its output power supply connector (thus powering-on the next enclosure in the daisy chain)

During the enclosure discovery procedure 500, the power management module 124 transmits power control commands to the power supply module 122 and enclosures in the one or more pluralities of storage enclosures 126. Thus, based on the configuration retrieved from the memory (not depicted), the power management module 124 may or may not receive responses to the power control commands. If the power management module 124 receives an unexpected power control command response, or does not receive a power control command response when a response is expected, the enclosure discovery procedure 500 interrupts, and the data storage sub-system 120 is put offline, until misconfiguration issues are fixed by operators of the present technology.

Fault Tolerance

Generally speaking, the daisy-chain arrangement of the first plurality of storage enclosures 420 forming a loop tolerates two types of failures: (i) if one of the first power supply connector 432 and the second power supply connector 436 or one of the first output power supply connector 322 and the second output power supply connector 324 fails, power supply to the first plurality of storage enclosures 420 is still guaranteed; and (ii) if one or more power-line cords in the first plurality of storage enclosures 420 fail, enclosures in the first plurality of storage enclosures 420 may still function as long there is a chain of functioning power-line cords from the enclosures to the power supply module 122.

It should be noted that it may be beneficial to have more than one plurality of storage enclosures that are connected in a daisy chain arrangement in the data storage sub-system 120. It is contemplated that having multiple daisy-chains (such as the first plurality of storage enclosures 420, the second plurality of storage enclosures 440, and the third plurality of storage enclosures 460) makes the failure domain of the data storage sub-system 120 larger, and more fault-tolerant in general, as malfunction of components in one daisy-chain arrangement (e.g. the first plurality of storage enclosures 420) does not affect component in other daisy-chain arrangements (e.g. the second plurality of storage enclosures 440). Further, a given output power supply connector of plurality of output power supply connectors 320, has a maximum allowed current capacity (i.e. a current threshold), that can be carried thereon to ensure optimal functionality. Thus, as a result of the current threshold, having a high number of storage enclosures in a single daisy chain may not allow satisfying power requirements of all storage enclosures in the single daisy chain.

Interfaces

It may now be apparent that electric power in the data storage sub-system 120 is supplied through the power control network 200 in a hierarchical manner via three different interfaces A first interface for transmission of power between the power supply module 122 and a given plurality of storage enclosures of the one or more pluralities of storage enclosures 126, by selectively switching one of the plurality of output power supply connectors 320. As a non-limiting example, for the first plurality of storage enclosures 420, the power supply module 122 has the first output power supply connector 322, which corresponds or connects to the first power supply connector 432 of the first storage enclosure 422 of the first plurality of storage enclosures 420. The first interface allows to selectively switch the first output power supply connector 322 of the power supply module 122, which connects the power supply module 122 to the first storage enclosure 422 to provide power thereto.

A respective second interface for transmission of power between storage enclosures in a given plurality of storage enclosures of the one or more pluralities of storage enclosures 126. As stated above, a storage enclosure in the first plurality of storage enclosures 420 can only be activated if a prior-sequential storage enclosure is active. Thus, the second storage enclosure 424 connected to the first storage enclosure 422 in the first plurality of storage enclosures 420 can be activated only if the first storage enclosure 422 is active, and if the first storage enclosure 422 has received a power control command from the power management module 124 to transmit power to activate the second storage enclosure 424. To activate a storage enclosure connected to prior-sequential active storage enclosure in the given plurality of storage enclosures, the power management module 124 has to explicitly request the prior-sequential active storage enclosure to transmit power functionally downstream to the consecutive storage enclosure by using the address of the prior-sequential active storage enclosure.

A respective third interface for transmission of electric power between the given storage enclosure 260 and the given disk storage 292 in the respective set of disk storages 290 contained therein.

In a sense, a given disk storage 292 located inside a given storage enclosure 260 in a plurality of storage enclosures can only be activated if the given storage enclosure 260 is active. The given storage enclosure 260 in the plurality of storage enclosures can be activated only if all storage enclosures functionally upstream from the given storage enclosure are active. One of the storage enclosures connecting to the power supply module 122 can be activated only if the corresponding output power supply connector on the power supply module 122 has been switched on.

Figure 6:
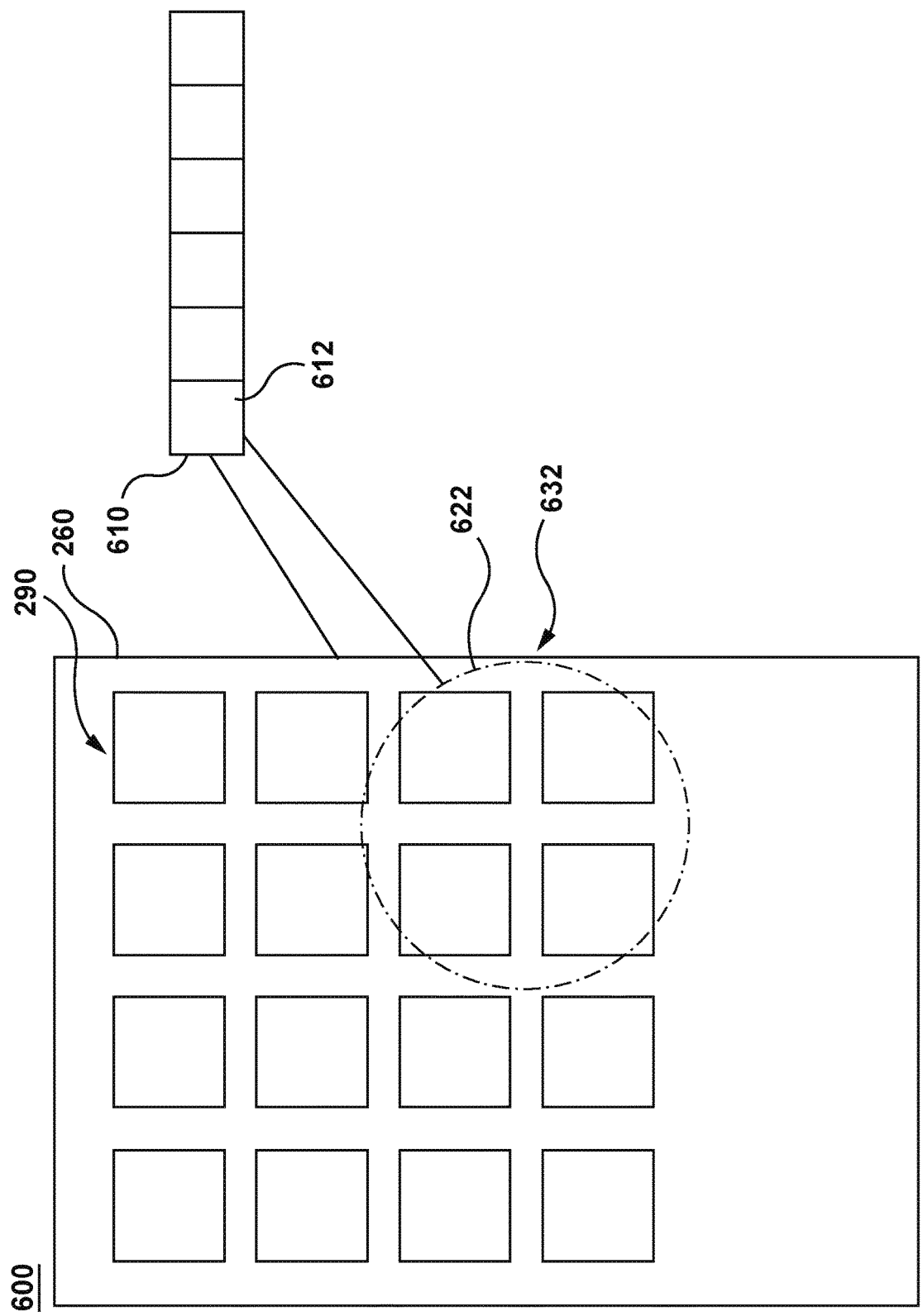
FIG. 6 depicts a schematic diagram software architecture of the respective set of disk storages of the given storage enclosure in accordance with non-limiting embodiments of the present technology.

Reference is now made to FIG. 6, which depicts a schematic diagram of a software architecture 600 of the respective set of disk storages 290 of the given storage enclosure 260 in accordance with the non-limiting embodiments of the present technology. It is noted that FIG. 6 schematically depicts "protection groups" as contemplated by the various embodiments of the present technology. It is noted that protection groups can include disks from different disk enclosures even if not expressly depicted as such.

Software

Logical Partitioning and Protection Groups

The system 100 including the one or more storage control processors 110 and the data storage sub-system 120 implements an object-based storage architecture to store objects (i.e. execute write operations) and retrieve objects (i.e. execute read operations) in response to client requests transmitted by client devices (not depicted) via the one or more storage control processors 110.

The respective set of disk storages 290 inside the given storage enclosure 260 are associated with a respective set of logical partitions 610. The respective set of logical partitions 610 includes at least one logical partition. The logical partitions 610 can include one or more of the respective sets of disk storages 290 that can be associated with the same or different storage enclosures. It is noted that the disk storages 290 can be dynamically associated to the logical partitions 610, when required.

A given logical partition 612 of the respective set of logical partitions 610 can be hosted on one or more disk storages of the respective set of disk storages 290, which will be referred to as the set of partition disk storages 622. It should be understood that the set of partition disk storages 622 is a subset of the respective set of disk storages 290 present in the given storage enclosure 260. Thus, the respective set of disk storages 290 hosts the respective set of logical partitions 610, where the given logical partition 612 of the set of logical partitions 610 is hosted on the respective set of partition disk storages 622, whether or not they are physically located within the same storage enclosure 260.

It is contemplated that the given logical partition 612 can be hosted on multiple disk storages in the respective set of disk storages 290 for performance reasons for example.

The given logical partition 612 can be accessed to execute operations thereon, such as read operations and/or write operations, only if the set of partition disk storages 622 is active, i.e. the given storage enclosure 260 hosting the given logical partition 612 has been activated by receiving power from the power supply module 122, and the set of partition disk storages 622 is active by receiving power from the given storage enclosure 260.

In the context of the present technology, the respective set of partition disk storages 622 will be referred to as, or is associated with, a given "protection group" 632.

It should be noted that in some non-limiting embodiments of the present technology, the given protection group 632 can host two or more logical partitions of the set of logical partitions 610.

It should be noted that in accordance with the non-limiting embodiments of the present technology, two logical partitions can be located either on two separate sets of disk storages or share entirety of a set of disk storages.

As a non-limiting example, a first logical partition (not depicted) can be located on a first disk storage A and a second logical partition (not depicted) can be located on a second disk storage B. As another example, a first logical partition (not depicted) is hosted on disk storages A, B, and C, (not depicted) and a second logical partition (not depicted) is hosted on disk storages A, B, and C (not depicted).

Thus, it can be said that a given protection group 632 hosts one or more logical partitions, and each of the one or more logical partitions require all disk storages in the set of partition disk storages 622 to be active, and no other disk storage. Thus, in the context of the present technology, a given protection group 632 can be considered as being an independent entity.

Figure 7:
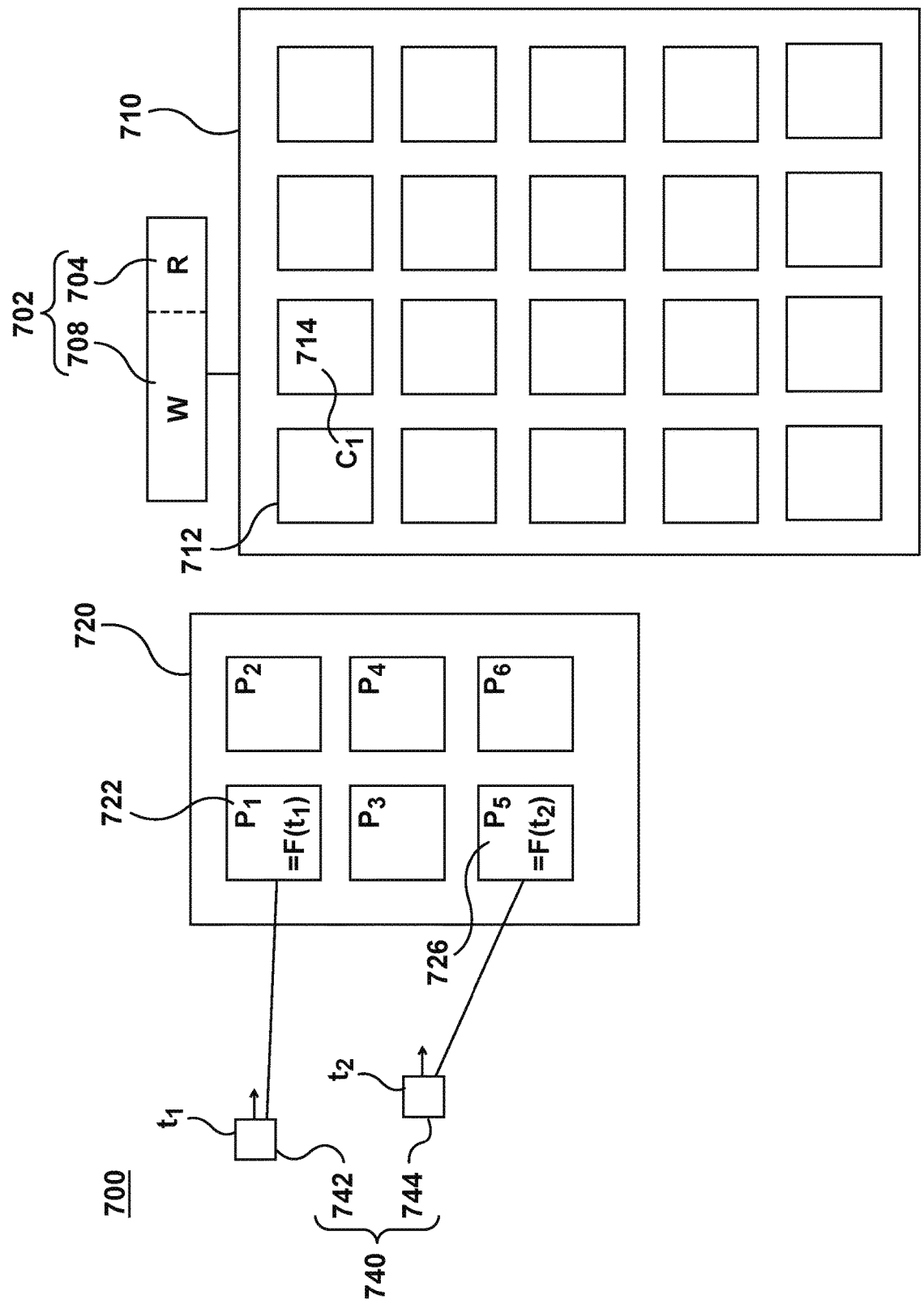
FIG. 7 depicts a schematic diagram of an object distribution procedure in accordance with non-limiting embodiments of the present technology.

Now turning to FIG. 7, there is depicted an object distribution procedure 700 in accordance with non-limiting embodiments of the present technology.

The data storage sub-system 120 has a plurality of protection groups 710, stored on the disk storages of the one or more pluralities of storage enclosures 126 (FIG. 4).

As stated herein above, the data storage sub-system 120 is operated such that a total power budget is guaranteed at any moment in time, i.e. the data storage sub-system 120 operates at a total power budget 702. It should be noted that to execute client requests optimally, the data storage sub-system 120 operates below the total power budget 702, to consume as much electric power as is available to the data storage sub-system 120 to execute a maximal number of client requests.

In accordance with the non-limiting embodiments of the present technology, the total power budget 702 includes a total read operations power budget 704, and a total write operations power budget 708 created as a result of the total power budget 702 and the requirement to ensure commitment to the write operations. In accordance with the non-limiting embodiments of the present technology, the total power budget 702 represents a configurable power budget of the system. In accordance with the non-limiting embodiments of the present technology, the system guarantees not to exceed the so-set total power budget 702.

The total write operations power budget 708 is fixed, and allows the data storage sub-system 120 to maintain a constant number of disk storages active for any given moment in time, which translates to a constant number of protection groups that can accept write operations simultaneously for any given moment in time.

As a non-limiting example, the total power budget 702 configured for the data storage sub-system 120 may allow keeping twenty three (23) disk storages active. The data storage sub-system 120 may be configured to have five (5) disk storages for a given protection group 712. In this non-limiting example, the total power budget 702 may be divided between a total write operations power budget 708 and total read operations power budget 704 in a 16:7 ratio, where sixteen (16) disk storages may accept execution of write operations simultaneously, and seven (7) disk storages may accept execution of read operations simultaneously. In such a scenario, three (3) protection groups could accept write operations and one (1) protection group could accept read operations simultaneously.

Thus, in this example, it can be seen that even though the write operations were assigned with a portion of the total power budget, which portion would enable concurrent operation of sixteen (16) disk storages, not all of the "supported" sixteen disk storages are used. This is due to the fact that based on such an example of the constraint, it is possible to concurrently maintain three (3) active protection groups (representative of the "write bandwidth threshold"). Thus, in this scenario the total power budget will be underutilized. Even though the total power budget could have supported operation of an additional disk storage, this additional disk storage can not be utilized as its operation would require an additional protection group. Thus, the speed of execution of write operations is as high as permitted by three (3) concurrently operated protection groups.

Thus, data storage sub-system 120 will operate below the total write power budget, as given the configuration only fifteen (15) disk storages will be used for write operations simultaneously, which is not an 'optimal' use of the total write power budget as available resources are underutilized.

Protection groups which accept execution of write operations in response to a client request are part of a set of active protection groups 720. The set of active protection groups 720 includes a number of N protection groups, each having as an identifier a number from 0 to N−1, N being the number of protection groups that can accept execution of write operations simultaneously in the data storage sub-system 120 in response to client requests.

Incoming objects 740, i.e. data to be written to the data storage sub-system 120 transmitted via the one or more storage control processors 110, are distributed between protection groups in the set of active protection groups 720 to be stored. It is noted that a given incoming object 740 is written to a given protection group of the set of active protection groups 720. In other words, a given incoming object 740 can not be "split" into portions, which portions can not be split between different protection groups of the active protection groups 720.

In some non-limiting embodiments of the present technology, distribution of the incoming objects 740 can be implemented on a timestamp basis. The identifier of the protection group (i.e. a number associated with the protection group) of the set of active protection groups 720 being chosen to store a given object at a given moment in time t may be determined based on:

$$\text{online\_protection\_group\_num} = \text{FUNC}_N(\text{timestamp})$$

where $\text{FUNC}_N$ is a function that maps a timestamp associated with the given object to an integer value belonging to the range [0, N−1], where N is equal to the number of protection groups in the set of active protection groups 720.

As a non-limiting example, a first incoming object 742 may be received by the one or more storage control processors 110, at time $t_1$, and may have been determined, by the one or more storage control processors 110, to be stored in a first protection group 722 (corresponding to zero for example) based on the received time $t_1$, and a second incoming object 744 may be received at time $t_2$, and may have been determined, by one or more storage control processors 110, to be stored in a fifth protection group 726 (corresponding to number four) based on the received time $t_2$.

It should be mentioned that each given protection group 712 of the plurality of protection groups 710 has a respective total storage capacity 714, as a result of the individual storage capacity of each disk storage within the given protection group 712.

In order for the data storage sub-system 120 to operate at a maximum bandwidth value available under the total write operations power budget 708, when a given protection group 712 reaches its respective total storage capacity 714, the data storage sub-system 120 needs to maintain one or more 'spare' protection groups with available storage space, such that when a given protection group in the set of active protection groups 720 become full and reaches its respective total storage capacity 714, the data storage sub-system 120 can 'switch' to the one or more spare protection groups, by replacing the protection group having reached its respective total storage capacity 714 with a spare protection group, thus allowing the data storage sub-system 120 to operate at a maximum bandwidth value available under the total write operations power budget 708.

However, in such a scenario, for the data storage sub-system 120 to operate at a maximum bandwidth value available under the total write operations power budget 708, the power management module 124 of the data storage sub-system 120 has to deactivate the one or more full protection groups (not depicted in FIG. 7), and activate the one or more spare protection groups—which is time consuming, and translates into latency for the client device having requested storage of the incoming objects 740. Such a scenario is thus not ideal for client devices, which have to wait additional time to store data in the data storage sub-system 120.

Figure 8:
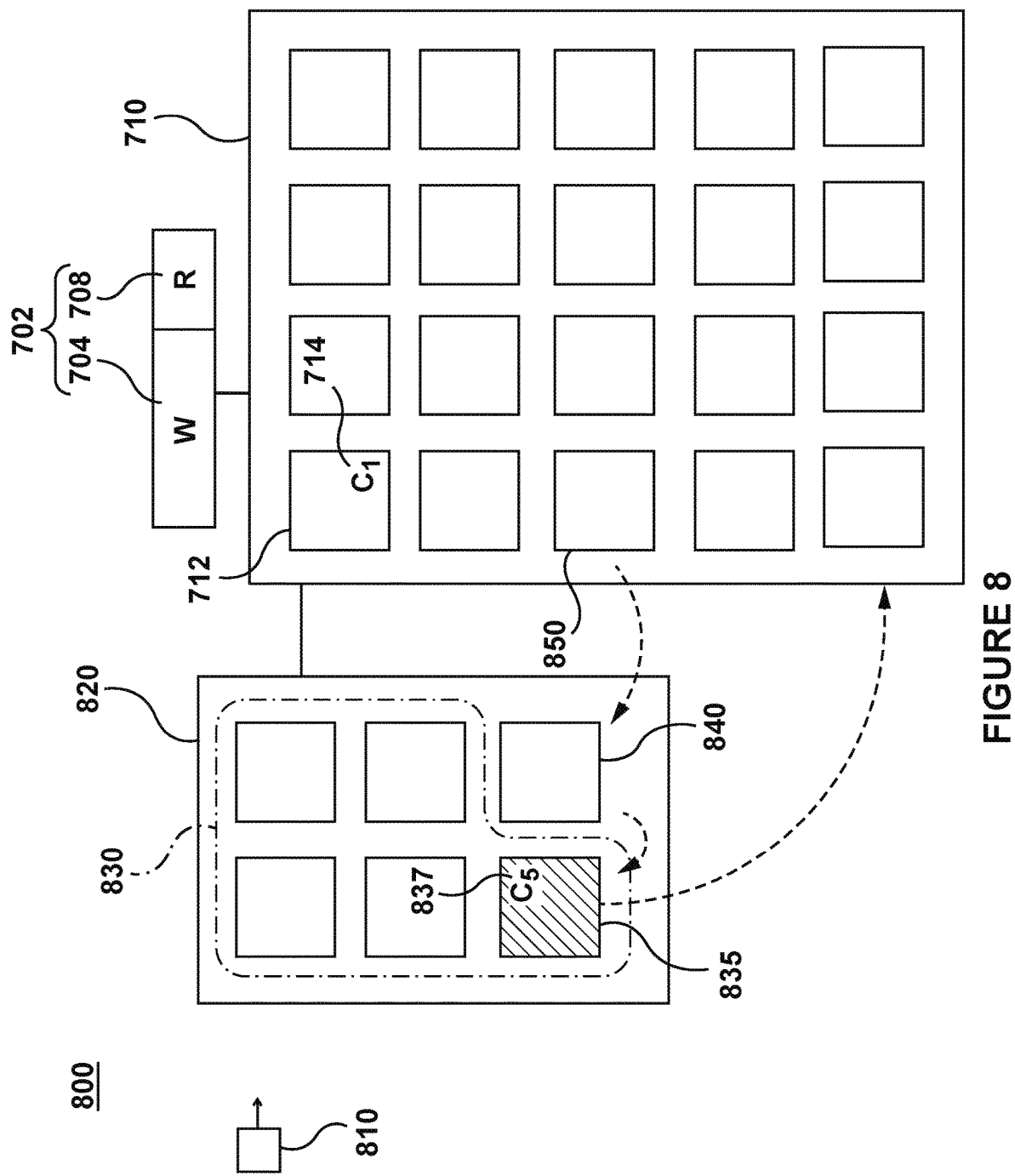
FIG. 8 depicts a first protection group replacement scenario in accordance with non-limiting embodiments of the present technology.

Reference will now be made to FIG. 8, which depicts a first protection group replacement scenario 800 in accordance with non-limiting embodiments of the present technology.

First Protection Group Replacement Scenario

To solve the problem arising in the scenario explained above with respect to FIG. 7, in accordance with a first non-limiting embodiment of the present technology, the data storage sub-system 120 can be configured according to the first protection group replacement scenario 800 during its provisioning. The first protection group replacement scenario 800 ensures that latency for client devices is minimized when one protection group of a set of active protection group does not have any available storage space after executing write operation at a given moment in time, and must be replaced by a protection group having available storage space to execute write operations. According to the first protection group replacement scenario 800, the data storage sub-system 120 is configured in the following way:

during provisioning of the data storage sub-system 120, a number of N protection groups of the plurality of protection groups 710 are activated via the power management module 124 to form the set of active protection groups 820. It is noted that as part of the activation of the number of N protection groups of the plurality of protection groups 710, the protection group may also need to be created (i.e. initialized). Thus, it can be said that the disk storages initially exist in a non-assigned state (i.e. non-associated with protection groups). The system maintains a mapping (not depicted) of which protection groups are mapped to which disk storages.

a subset of active protection groups 830 of the set of active protection groups 820 is configured to accept incoming objects 810, i.e. accept requests to execute write operations. In some non-limiting embodiments of the present technology, the subset of active protection groups 830 includes N−1 protection groups of the set of active protection groups 820. However, it is contemplated that in alternative non-limiting embodiments of the present technology, the subset of active protection groups 830 can include N—Z protection groups of the set of active protection groups 820, where Z>1.

a remaining protection group 840 of the set of active protection groups 820 is configured to be a "spare protection group", i.e. it is in the set of active protection groups 820 but, does not accept incoming objects, i.e. execution of write operations thereon.

when a given protection group 835 of the subset of active protection groups 830 reaches its respective storage capacity limit 837, the given protection group 835 is deactivated (i.e. stops receiving write requests), and the remaining protection group 840 is added to the subset of active protection groups 830, i.e. the remaining protection group 840 is configured to accept execution of write operations. In other words, in response to any one of the subset of active protection groups 830 reaches its respective storage capacity limit 837, the write operations are routed to the remaining protection group 840.

once the remaining protection group 840 starts executing write operations in response to requests, the given full protection group 835 is deactivated (i.e. switched off such that the now-freed up portion of the power budget can be used for the new protection group), and a new protection group 850 from the plurality of protection groups 710 is activated and added to the set of active protection groups 820, thus becoming a new remaining protection group (not depicted) of the set of active protection groups 820.

the two preceding steps are repeated every time another given protection group of subset of active protection groups 830 reaches its respective storage capacity limit 837, until all protection groups in the plurality of protection groups 710 are used by the data storage sub-system 120 (in scenarios where protection groups are pre-created) or until the system runs out of disk storages that can be used to create new active protection groups (in scenarios where protection groups are created on demand).

It should be noted that the first protection group replacement scenario 800 works as long as only one protection group in the set of active protection groups 820 reaches its respective storage capacity limit 837 at a given moment in time. If two or more protection groups in the set of active protection groups 820 reach their respective storage capacity limit 837 substantially at the same time, maintaining only one remaining protection group 840 in the set of active protection groups 820 does not allow the data storage sub-system 120 to operate equal to a maximum bandwidth value available under the total write operations power budget 708. This is due to the fact that switching power from one protection group (the one that ran out of storage space) to another (the new protection group to be activated) takes time. Thus, in a time the power switch is executed, the system would operate with a delay (due to lack of a ready-to be used additional protection group).

Further, having multiple remaining protection groups in the set of active protection groups 820 as spare protection groups does not allow the data storage sub-system 120 to operate optimally, as the data storage sub-system 120 needs to provide power to the multiple remaining protection groups without the remaining protection groups accepting execution of write operations.

Figure 9:
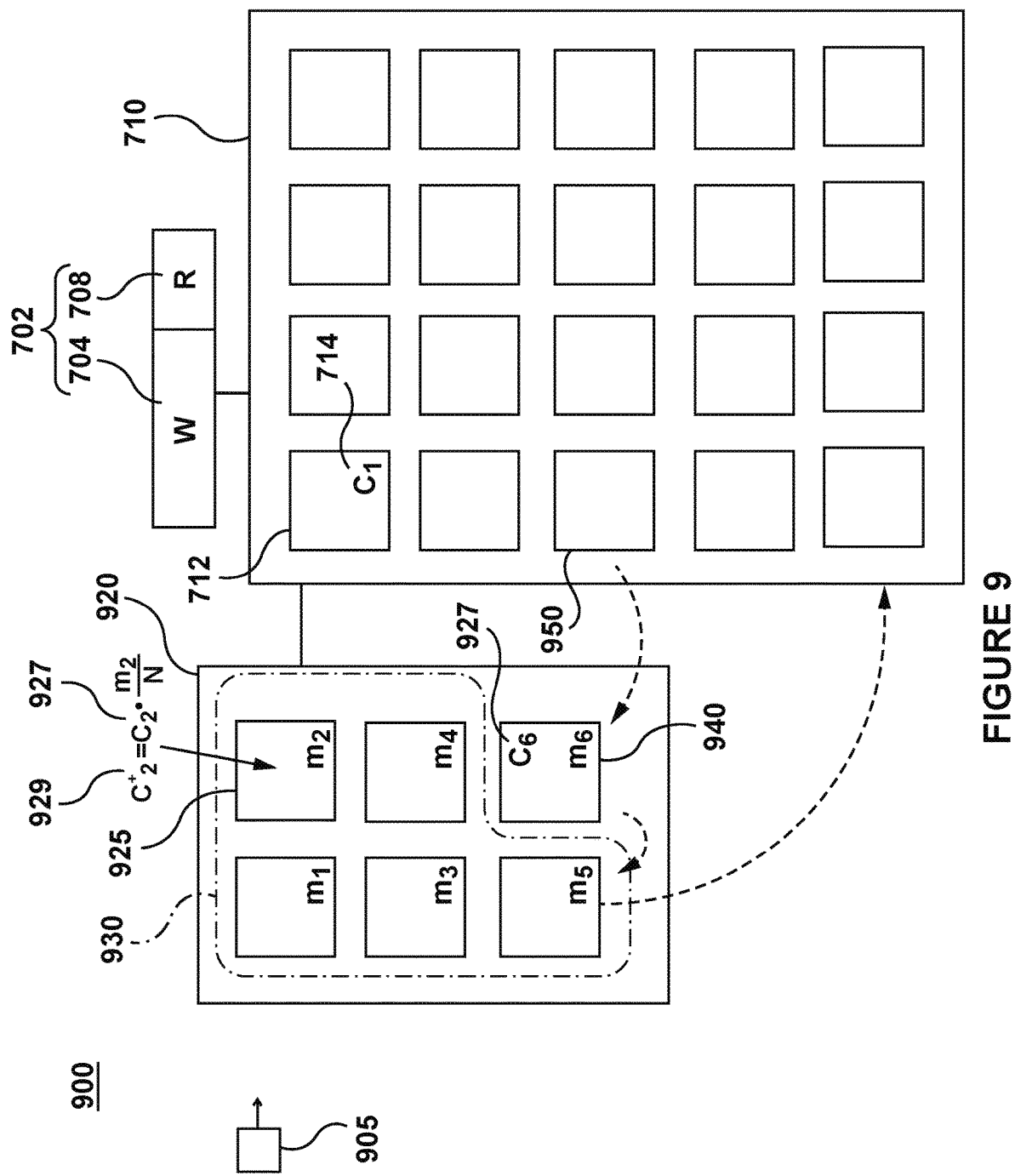
FIG. 9 depicts a schematic diagram of a second protection group replacement scenario 900 in accordance with non-limiting embodiments of the present technology.

With reference to FIG. 9, there is depicted a second protection group replacement scenario 900 in accordance with non-limiting embodiments of the present technology.

Second Protection Group Replacement Scenario

The data storage sub-system 120 can be configured according to the second protection group replacement scenario 900 during its provisioning. The second protection group replacement scenario 900 ensures that latency for client devices is minimized when multiple protection groups of a set of active protection group run out of storage space before a new protection group is activated.

According to second protection group replacement scenario 900, the data storage sub-system 120 is configured in the following way:

during provisioning of the data storage sub-system 120, a number of N protection groups of the plurality of protection groups 710 are activated to form the second set of active protection groups 920, where each given protection group 925 of the second set of active protection groups 920 has a respective total storage capacity 927, the respective total storage capacity 927 corresponding to total usable space on the disk storages (not depicted) of the given protection group 925.

a second subset of active protection groups 930 of the set of active protection groups 920 is configured to accept incoming objects 905, i.e. execute write operations. In some non-limiting embodiments of the present technology the second subset of active protection groups 930 includes N−1 protection groups of the second set of active protection groups 920.

The respective second total storage capacity 929 for the given protection group 925 of the second subset of active protection groups 930 is: a respective total storage capacity 927 multiplied by a ratio of an identification number m associated with the given protection group 925, and a total number of protection groups N−1 in the second subset of active protection groups 930. It can be said that the respective second total storage capacity 929 depends, or is based on: the identification number of the given protection group 925 in the second set of active protection groups 920, the number of protection groups in the second subset of active protection groups 930, and the respective total storage capacity 927 of the given protection group 925.

Each given protection group 925 in the second subset of active protection groups 930 has a different respective second total storage capacity 929, and will be replaced by a remaining protection group 940 upon reaching m/N−1 of its respective total storage capacity 927. Having different respective second total storage capacity 929 for each of the initially created protection groups in the second subset of active protection groups 930 reduces the probability that two or more protection groups in second subset of active protection groups 930 reach their total storage capacity close in time.

Only the initially created protection groups in the second subset of active protection groups 930 can be replaced by a remaining protection group 940 before reaching the respective total storage capacity 927. The initially created protection groups are deactivated by the power management module 124 when reaching their different respective second total storage capacity 929.

Protection groups activated after the initially created protection groups (i.e. the second subset of active protection groups 930 that is activated at provisioning of the data storage sub-system 120) will be replaced by the remaining protection group 940 only after reaching their respective total storage capacity 927. Thus, the protection groups activated after the initially created protection groups include all protection groups in the plurality of protection groups 710 (which can be pre-created or created on demand), excluding protection groups in the second subset of active protection groups 930 created at provisioning of the data storage sub-system 120

Once the data storage sub-system 120 has used all protection groups of the plurality of protection groups 710 as the remaining protection group 940 in the second set of active protection groups 920, the remaining capacity of each of the initially created protection groups in the second subset of active protection groups 930 will be used.

Thus, during provisioning of the data storage sub-system 120, N−1 protection groups form the second subset of active protection groups 930, where each given protection group 925 has a respective second total storage capacity 929, and a respective total storage capacity 927. The remaining protection group 940 is associated with the respective total storage capacity 927, and each given protection group 712 of the plurality of protection groups 710 is associated with their respective total storage capacity 714.

When a given protection group 925 of the second subset of active protection groups 930 reaches the respective second total storage capacity 929, it is deactivated, and replaced by the remaining protection group 940 which becomes part of the second subset of active protection groups 930. One of the plurality of protection group 710 is activated, and becomes the new remaining protection group. The remaining protection group 940 (now in the second subset of active protection groups 930) has as its threshold the respective total storage capacity 927. Thus, the N−1 initial protection groups are deactivated after reaching the respective second total storage capacity 929, without having reached their respective total storage capacity 927. Other protection groups added to the second subset of active protection groups 930 will be replaced after reaching their respective total storage capacity 927, i.e. when becoming completely full.

Once every protection group in the plurality of protection groups 710 has been added to the second subset of active protection groups 930 and reached the respective total storage capacity 927, the initially created protection groups (which have available space) are added again to the second subset of active protection groups 930, and their remaining storage capacity (i.e. the respective total storage capacity 927 minus the respective second total storage capacity 929) will be used to store incoming objects.

Figure 10:
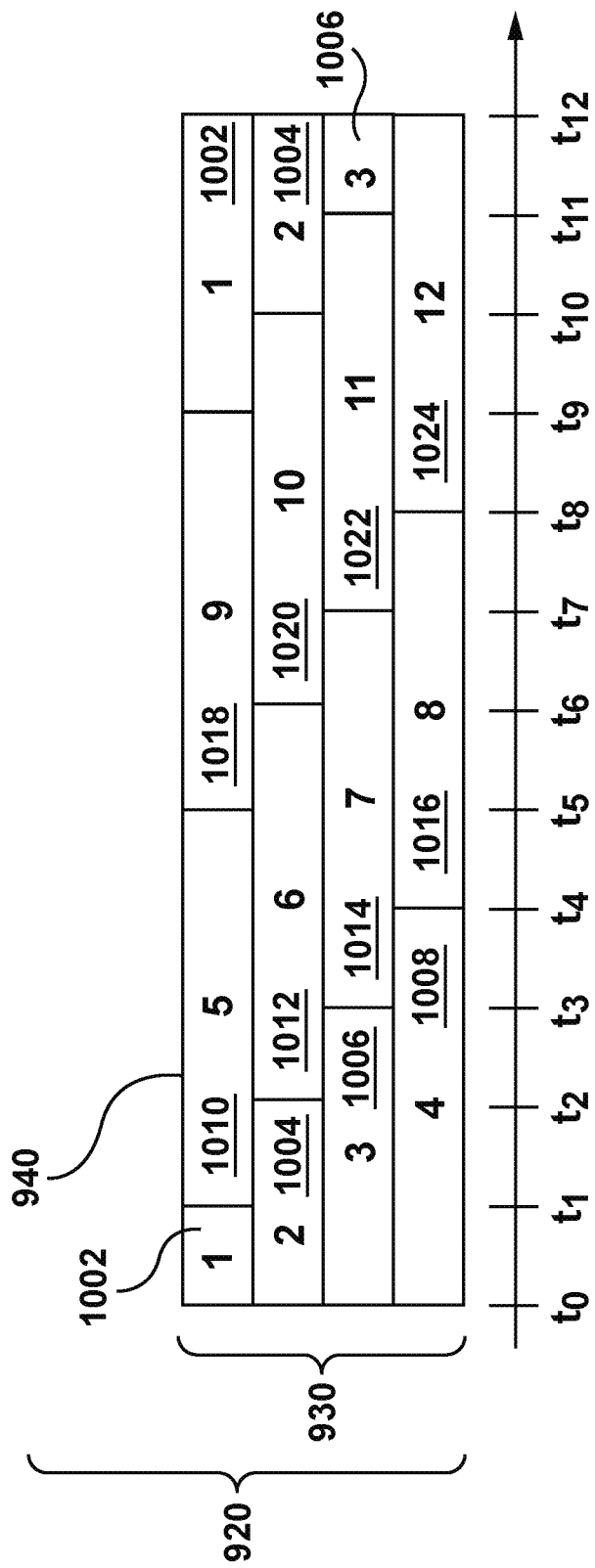
FIG. 10 depicts a schematic diagram of a non-limiting example of the second protection group replacement scenario in accordance with non-limiting embodiments of the present technology.

Reference is now made to FIG. 10, which depicts a non-limiting example of the second protection group replacement scenario 900 in accordance with non-limiting embodiments of the present technology.

In this non-limiting example, the plurality of protection groups 710 has twelve (12) protection groups: a first protection group 1002 having as an identifier one (1), a second protection group 1004 having as an identifier two (2), a third protection group 1006 having as an identifier three (3), a fourth protection group 1008 having as an identifier four (4), a fifth protection group 1010 having as an identifier five (5), a sixth protection group 1012 having as an identifier six (6), a seventh protection group 1014 having as an identifier seven (7), an eighth protection group 1016 having as an identifier eight (8), a ninth protection group 1018 having as an identifier nine (9), a tenth protection group 1020 having as an identifier ten (10), an eleventh protection group 1022 having as an identifier eleven (11), and a twelfth protection group 1024 having as an identifier twelve (12).

During provisioning of the data storage sub-system 120 at time $t_0$, the power management module 124 activates 5 protection groups to be in the second set of active protection groups 920: the first protection group 1002, the second protection group 1004, the third protection group 1006, the fourth protection group 1008, and the fifth protection group 1010.

At time $t_0$, four (4) protection groups are configured to accept execution of write operations, and are thus part of the second subset of active protection groups 930: the first active protection group 1002, the second active protection group 1004, the third active protection group 1006, and the fourth active protection group 1008. The fifth active protection group 1010 is the remaining protection group 940. One or more protection groups in the second subset of active protection groups 930 execute write operations and store data in the form of objects.

At time $t_1$, the first active protection group 1002 reaches the respective second total storage capacity 929, which is equal to ¼ of the respective total storage capacity 927, and is replaced by the fifth active protection group 1010, i.e. the remaining protection group 940, which is added to the second subset of active protection groups 930. The first active protection group 1002 is deactivated by the power management module 124, and a sixth protection group 1012 is activated and added to the second set of active protection groups 920 to become the 'new' remaining protection group 940.

At time $t_2$, the second active protection group 1004 reaches the respective second total storage capacity 929, which is equal to ½ of the respective total storage capacity 927, and is replaced by the sixth active protection group 1012, which is added to the second subset of active protection groups 930. The second active protection group 1004 is deactivated by the power management module 124, and a seventh protection group 1014 is activated and added to the second set of active protection groups 920 to become the 'new' remaining protection group 940.

At time $t_3$, the third active protection group 1006 reaches the respective second total storage capacity 929, which is equal to ¾ of the respective total storage capacity 927, and is replaced by the seventh active protection group 1014, which is added to the second subset of active protection groups 930. The third active protection group 1006 is deactivated by the power management module 124, and an eighth protection group 1016 is activated and added to the second set of active protection groups 920 to become the 'new' remaining protection group 940.

At time $t_4$, the fourth active protection group 1008 reaches the respective second total storage capacity 929, which is equal to the respective total storage capacity 927, it is replaced by the eighth active protection group 1016, which is added to the second subset of active protection groups 930. The fourth active protection group 1008 is deactivated by the power management module 124, and a ninth protection group 1018 is activated and added to the second set of active protection groups 920 to become the 'new' remaining protection group 940.

Thus, in this non-limiting example, the initial protection groups in the second subset of active protection groups 930 have all been deactivated before reaching their respective total storage capacity 927 (other than the fourth active protection group 1008 which has reached its storage capacity).

At time $t_5$, the fifth active protection group 1010 reaches the respective second total storage capacity 929, which is equal to the respective total storage capacity 927, and is replaced by the ninth active protection group 1018, which is added to the second subset of active protection groups 930. The fifth active protection group 1010 is deactivated by the power management module 124, and a tenth protection group 1020 is activated and added to the second set of active protection groups 920 to become the 'new' remaining protection group 940. It should be noted that for all protection group, other than the initial protection groups, the respective second total storage capacity 929 is equal to the total storage capacity.

At time $t_6$, the sixth active protection group 1012 reaches the respective second total storage capacity 929, which is equal to the respective total storage capacity 927, and is replaced by the tenth active protection group 1020, which is added to the second subset of active protection groups 930. The sixth active protection group 1012 is deactivated by the power management module 124, and an eleventh protection group 1022 is activated and added to the second set of active protection groups 920 to become the 'new' remaining protection group 940.

At time $t_7$, the seventh active protection group 1014 reaches the respective second total storage capacity 929, which is equal to the respective total storage capacity 927, and is replaced by the eleventh active protection group 1022, which is added to the second subset of active protection groups 930. The seventh active protection group 1014 is deactivated by the power management module 124, and a twelfth protection group 1024 is activated and added to the second set of active protection groups 920 to become the 'new' remaining protection group 940.

At time $t_8$, the eighth active protection group 1016 reaches the respective second total storage capacity 929, which is equal to the respective total storage capacity 927, and is replaced by the twelfth active protection group 1024, which is added to the second subset of active protection groups 930. The eighth active protection group 1016 is deactivated by the power management module 124, and the first protection group 1002 is activated and added again to the second set of active protection groups 920.

At time $t_9$, the ninth active protection group 1018 reaches the respective second total storage capacity 929, which is equal to the respective total storage capacity 927, and is replaced by the first active protection group 1002, which is added again to the second subset of active protection groups 930. The ninth active protection group 1018 is deactivated by the power management module 124, and the second protection group 1004 is activated and added again to the second set of active protection groups 920.

At time $t_{10}$, the tenth active protection group 1020 reaches the respective second total storage capacity 929, which is equal to the respective total storage capacity 927, and is replaced by the second active protection group 1004, which is added again to the second subset of active protection groups 930. The tenth active protection group 1020 is deactivated by the power management module 124, and the third protection group 1006 is activated and added again to the second set of active protection groups 920.

At time $t_{11}$, the eleventh active protection group 1022 reaches the respective second total storage capacity 929, which is equal to the respective total storage capacity 927, and is replaced by the third active protection group 1006, which is added again to the second subset of active protection groups 930. The eleventh active protection group 1022 is deactivated by the power management module 124, and the fourth protection group 1008 is activated and added again to the second set of active protection groups 920.

At time $t_{12}$, the twelfth active protection group 1024 reaches the respective second total storage capacity 929, which is equal to the respective total storage capacity 927, and is replaced by the fourth active protection group 1008, which is added again to the second subset of active protection groups 930. The twelfth active protection group 1024 is deactivated by the power management module 124. All protection groups of the plurality of protection groups have reached their respective total storage capacity 927.

Figure 11:
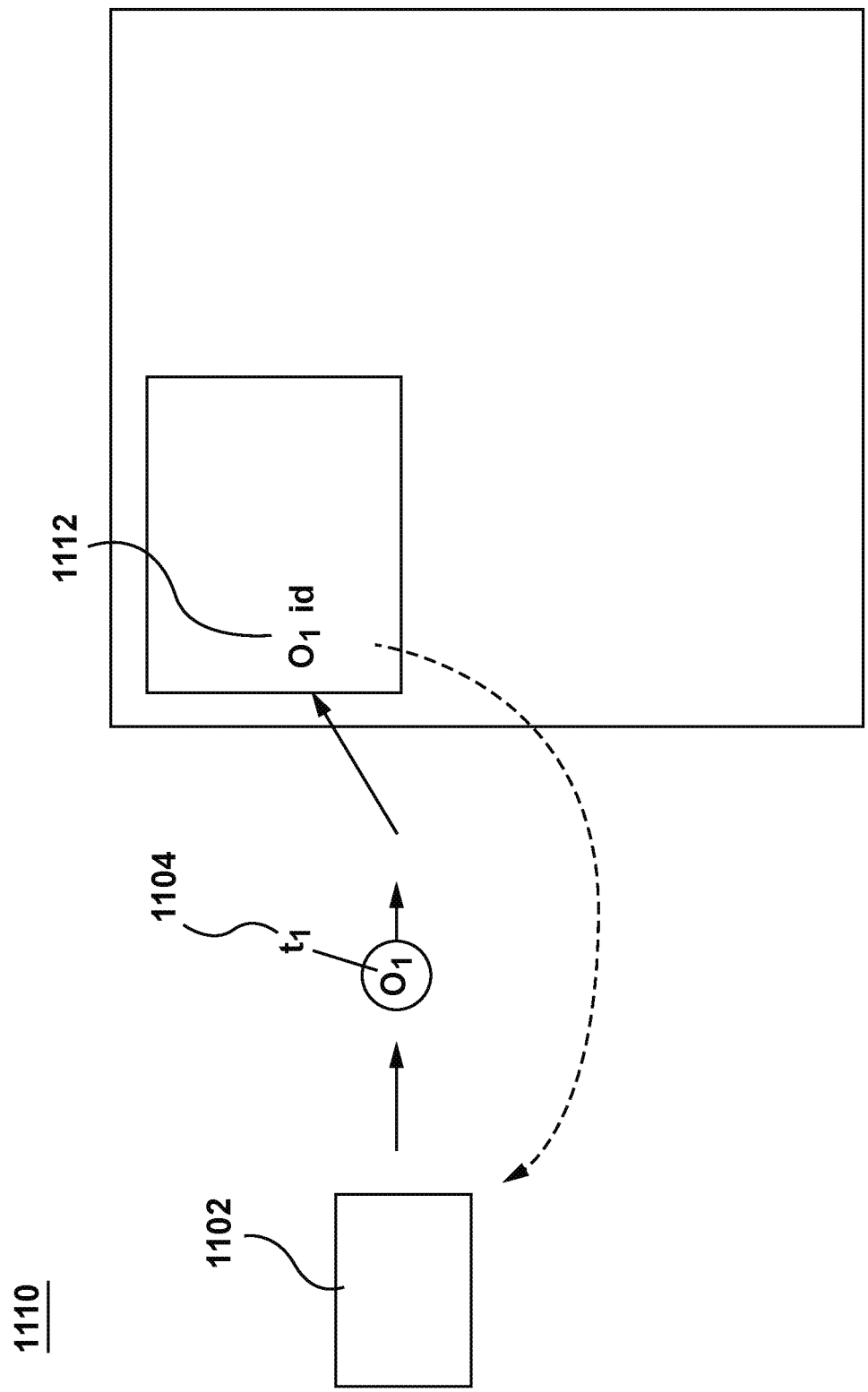
FIG. 11 depicts a schematic diagram of an object addressing procedure in accordance with non-limiting embodiments of the present technology.

Now turning to FIG. 11, there is depicted an object addressing procedure 1110 in accordance with non-limiting embodiments of the present technology.

Object Addressing

As stated herein above, the data storage sub-system 120 implements an object based architecture where data is stored in form of objects, where a given object is stored on the respective set of disk storages 290 associated with a given protection group, which can be part of the same or different storage enclosures.

Generally speaking, each object stored in the data storage sub-system 120 includes: respective object data, respective object metadata, and a unique object identifier.

In some embodiments of the present technology, a given object 1102 stored in the data storage sub-system 120 can be identified based on a time the given object has been received at the one or more storage control processors 110. The unique object identifier 1112 for the given object 1102 having been submitted via the one or more storage control processors 110 and stored in the data storage sub-system 120 may be used subsequently by client devices (not depicted) to retrieve the given object 1102. Generally speaking, once the given object has been successfully stored in the data storage sub-system 120, it is associated with the unique object identifier 1112. The unique object identifier 1112 is then transmitted to the client device (not depicted) via the one or more storage control processors 110 in response to its write operation request. The one or more storage control processors 110 determines the unique object identifier 1112 of the given object 1102 based on a timestamp 1104:

$$O\_ID = F\_NAME(\text{timestamp})$$

Where O_ID is the unique object identifier 1112, and F_NAME is a reversible function of the timestamp 1104

The given object 1102 can be located in the data storage sub-system 120 based on its respective timestamp 1104.

Figure 12:
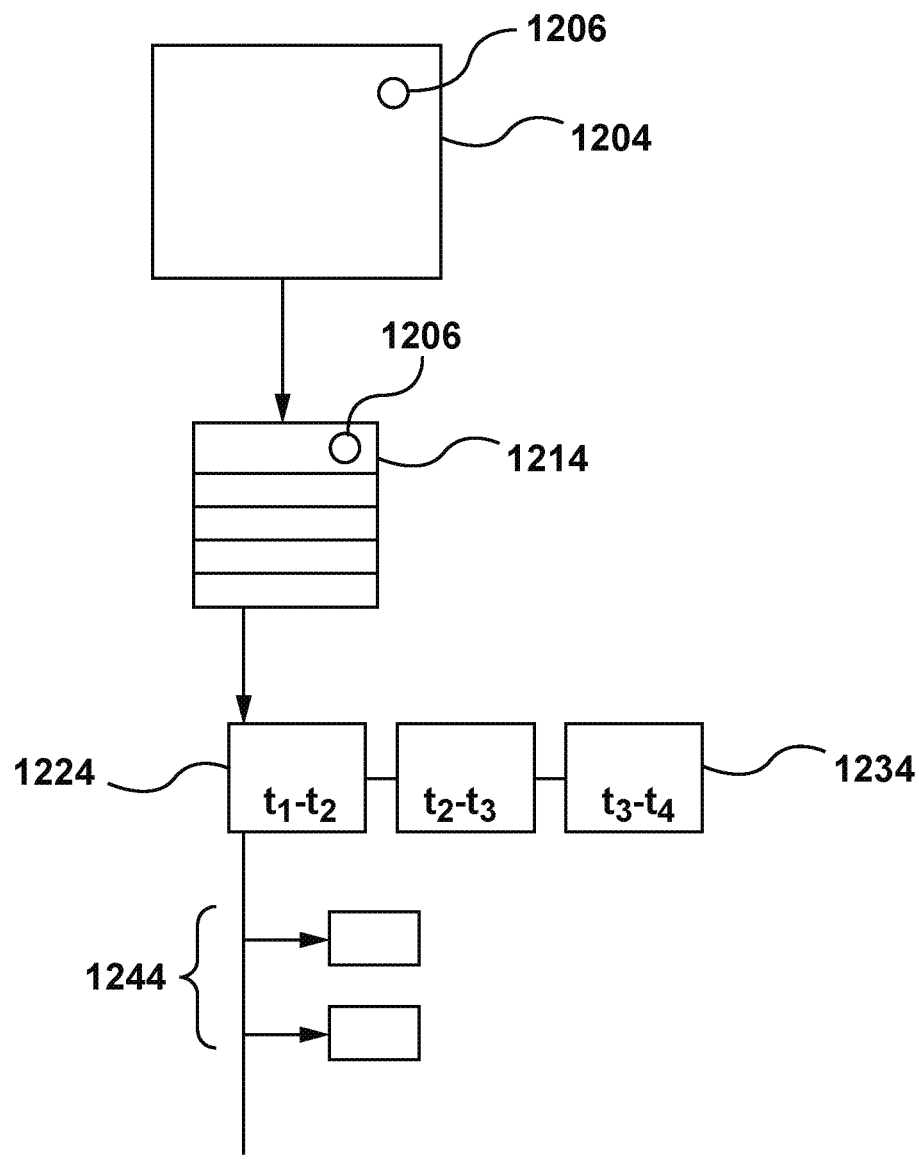
FIG. 12 depicts a schematic diagram of a protection group with an associated file system and associated container in accordance with non-limiting embodiments of the present technology.

With reference to FIG. 12, there is depicted a schematic diagram of a protection group 1204 with an associated file system 1214 including an associated container 1224 in accordance with non-limiting embodiments of the present technology.

File System

As stated herein above, every given object 1102 submitted to the data storage sub-system 120 at a given moment in time (i.e. associated with a respective timestamp 1104) is stored in a given protection group of the set of active protection groups (not depicted in FIG. 12)

Every time a protection group 1204 is created by the data storage sub-system 120, the data storage sub-system 120 is configured to create an associated respective file system 1214 on top of the protection group 1204. Thus, when an object 1206 is stored in the protection group 1204, it is stored in the respective file system 1214 associated with the given protection group 1204.

When objects are stored in the associated respective file system 1214, the objects are stored in first-level directories of the file system 1214, which will be referred to as containers 1224.

In some non-limiting embodiments of the present technology, a new container is created once a predetermined period of time lapses. The predetermined period of time may be determined during initialization of the data storage sub-system 120. The last created container in the data storage sub-system 120 is referred to as an active container 1234. It is noted that such a container is present in each active protection group, which are currently accepting objects for writing (i.e. the subset of active protection groups 930).

Thus, every incoming object is stored in the active container 1234. When the predetermined period of time expires, a new container is created and becomes active, and incoming objects are stored therein.

To summarize the above:
For any given moment in time, there is a predetermined number of active protection groups in the set of active protection groups accepting execution of write operations requests
Each protection group 1204 has a respective file system 1214
Each respective file system 1214 operates as follows:
New containers are created in the respective file system 1214 at predetermined periods of time
Incoming objects are stored by the data storage sub-system 120 in the last created container, the active container 1234.

The above is true for those incoming objects directed to a given protection group. Those incoming objects directed to a different protection group will be stored at a different active container.

In some non-limiting embodiments of the present technology, each container 1224 in a respective file system 1214 is configured to include a secondary directory structure 1244. The purpose of the secondary directory structure 1244 is to decrease metadata per directory. The secondary directory structure 1244 may have a depth from zero to a limit of the depth of the nested sub-directories allowed based on a type of the file system 1214 (if such limit is pre-set). If such limit is not pre-set, the limit can be based on the size of the file system. The depth and number of child directories per directory may be determined during provisioning the data storage sub-system 120. As an example, the depth can be two (2) levels or any other suitable number, considering a trade-off between defining the child structure (which may "eat up" storage space for storing information as to the child structure itself) and keeping the storage space for execution of client requests.

In some non-limiting embodiments of the present technology, objects are stored in at a lowest level of the secondary directory structure 1244. For each given moment in time, only one of the low-level directories can accept storing incoming objects. After a predetermined period of time, the active directory changes.

It should be noted that the lower-level directories and corresponding parent directories are created upon receiving a request therefor.

For M secondary directories at the lowest level, a new active directory (with required parents directories) can be created each period of time, the period of time being based on the total period of time of activity of the container in the data storage sub-system 120 divided by M (defined below).

$$\text{time\_frame} = \text{container\_active\_time}/M$$

As stated herein above, at each given moment in time there are N protection groups in the subset of active protection groups, where each protection group 1204 includes one respective active container 1234. A respective container name of the respective active container 1234 can be determined based on the respective time period, and a number associated with the protection group in the subset of active protection groups 930:

$$\text{container\_name} = F\_CONT(\text{time\_interval}, \text{online\_protection\_group\_num}),$$

where F_CONT is a function producing different outputs for different pairs of <time_interval, online_protection_group_num>.

It is possible to map a respective container name to a respective unique identifier of the respective protection group 1204, where the respective protection group 1204 stores the respective active container 1234.

The manner in which the mapping is implemented and stored is not limited as long as it is implemented and stored in a fault-tolerant way. As a non-limiting example, the mapping is implemented and stored by using a distributed replicated in-memory cluster-wide key-value store that is periodically flushed to persistent media.

As a result, incoming objects (not depicted) stored in the data storage sub-system 120 can be located in the following way:
i. Each given object 1102 has a unique object identifier 1112, the unique object identifier 1112 being determined based on the timestamp 1104
ii. A time interval (time_interval) may be determined based on the timestamp 1104. It is noted that in any given time interval a number of different containers may be created, thus the time interval in and of itself is not sufficient to unambiguously identify a given container, hence the use of the protection group identifier of (iii) below.
iii. The identifier of a protection group for storing the given object 1102 can be determined based on the timestamp 1104:

$$\text{online\_protection\_group\_num} = FUNC_N(\text{timestamp})$$

iv. The respective container_name X associated with the protection group can be determined based on the identifier of the protection group in the subset of active protection groups 930 and the time_interval:

$$\text{container\_name} = F\_CONT(\text{time\_interval}, \text{online\_protection\_group\_num})$$

v. The respective container name X can be mapped to the unique identifier of the respective protection group.
vi. The respective protection group has a file system with a first-level directory named container_name
vii. In some non-limiting embodiments of the present technology there may be a secondary directory structure inside the first-level directory with a path calculated using the timestamp
viii. Finally, the given 1102 object is a file within the identified directory with the unique object identifier 1112 being determined based on the timestamp 1104

In some non-limiting embodiments of the present technology, client devices can retrieve data from the data storage sub-system 120 (via the one or more storage control processors 110) without preliminary staging. To allow client devices to retrieve data from the data storage sub-system 120, the one or more storage control processors 110 may be configured in the following way:

1. A client sends a request asking the system to return an object with the specified object identifier:

GET(object_identifier)

2. The one or more storage control processors 110 can retrieve from the data storage sub-system 120 and return the object only if a protection group where the object is stored on is active
3. If the corresponding group is active when the client request is received, the data storage sub-system 120 returns the object to the client (via the one or more storage control processors 110);
4. If the corresponding group is inactive, then the one or more storage control processors 110 executes the following steps:
   a. schedules the protection group's activation
   b. calculates an estimation when in time the protection group will be in the active state
   c. sends this estimation to the client device. The one or more storage control processors 110 transmits the following reply:

<FORBIDDEN, time_to_wait, request_details>

Where "time_to_wait" indicates an amount of time after which the client should request the object again. The client device should provide "request details" structure as part of a repeated request. "request details" is unintelligible to the client device, but the one or more storage control processors 110 may encode a variety of useful details such as a timestamp when the client's read request was received at the one or more storage control processors 110 for example. The request details allow the one or more storage control processors 110 to take into account the starvation of the client device, and prioritize requests.

5. When "time_to_wait" passes, the client sends the following request:

GET(object_identifier, request_details)

6. If the required protection group is inactive, the server repeats step 4.
7. Steps 4-6 are repeated until the data storage sub-system 120 can return the requested object
8. The object is returned to the client The manner in which the scheduling is implemented is not limited, and several methods are known in the art.

As stated herein above, the data storage sub-system 120 has the total read operations power budget 704 (FIG. 7), and the data storage sub-system 120 operates such that the assigned total read operations power budget 704 is sufficient for powering up at least one protection group of the plurality of protection groups 710.

In some non-limiting embodiments of the present technology, a protection group in the subset of active protection groups 930 that is storing objects may be requested to retrieve one or more stored objects. The protection group may reach the total storage capacity and be deactivated while executing the retrieval of the one or more stored objects, which causes interruption and failure of the retrieval of the one or more objects (i.e. failure of the read operations). In such instances the one or more storage control processors 110 has two possible mechanisms to prevent failure: (i) having assigned a total power budget; and (ii) locking mechanisms for read operations and write operations.

These mechanisms can be used separately (when one is sufficient) or together (when each separately is not sufficient).

The locking mechanisms may be implemented as follows:
i. before being authorized to execute write operations, the one or more storage control processors 110 apply a lock on the protection group for writing.
ii. before being authorized to execute read operations, the one or more storage control processors 110 apply a lock on the protection group for reading
iii. the one or more storage control processors 110 cannot deactivate the protection group if a reading lock or a writing is present.

It should be noted that for those protection group executing read operations and write operations simultaneously, twice the amount of power is reserved (compared to what it actually consumes). The power is reserved from both read power budget and the write power budget. If the protection group reaches the respective second total capacity 929, it stops accepting write operations, and the corresponding writing lock is released. Also corresponding power reservation made from the write power budget is cancelled (thus making it possible to activate and authorize another protection group for writing).

Meanwhile, the protection group is not deactivated, since the corresponding reading lock is still in place. The corresponding power reservation made from the read power budget is also in place. Thus, the protection group continues accepting read operations until the corresponding reading lock is also released. When that happens, the corresponding reservation made from the read power budget is released, and since no locks remain, the protection group is deactivated.

Figure 13:
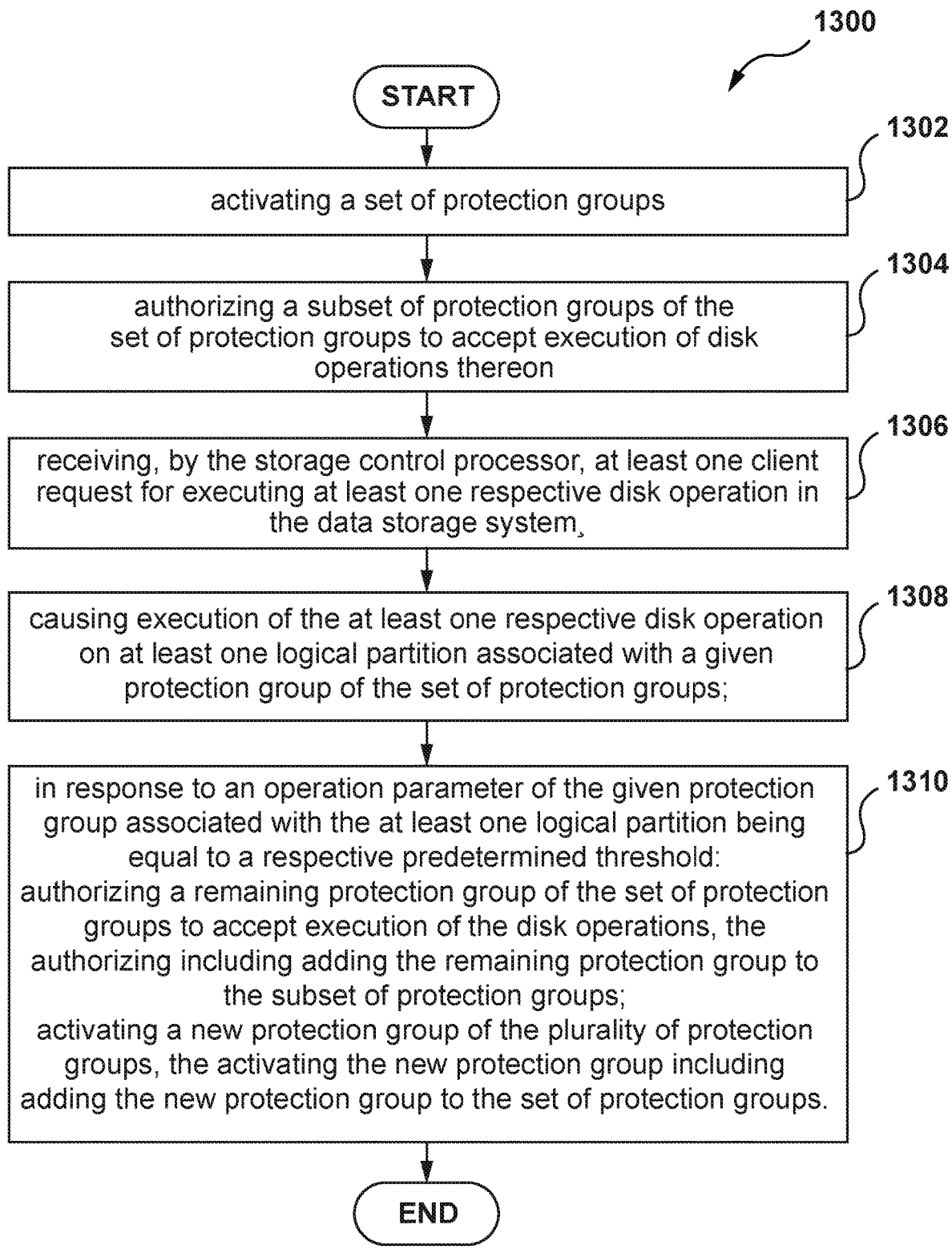
FIG. 13 depicts a flow chart of a method of executing disk operations in the data storage system in accordance with non-limiting embodiments of the present technology.

FIG. 13 depicts a flowchart of a method 1300 of executing disk operations in the system 100 in accordance with non-limiting embodiments of the present technology.

The method 1300 is executed by the one or more storage control processors 110, which in the description of the method 1300 is referred to, from time to time, as a "processor" for simplicity. The one or more storage control processors 110 has access to a memory (not depicted) having computer-readable instructions stored therein to execute the method 1300.

The method 1300 can be executed in instances when only one protection group in a subset of active protection groups reaches its respective total storage capacity, as explained herein above with respect to FIG. 8 depicting the first protection group replacement scenario 800.

The method 1300 begins at step 1302.

STEP 1302: Activating a Set of Protection Groups

At step 1302, the processor causes activation of a number of N protection groups of the plurality of protection groups 710 to form the set of active protection groups 820. The power management module 124 causes activation of a set of protection groups by activating one or more storage enclosures that include the set of protection groups to be activated. The one or more storage enclosures, in turn, activate the specific disk storages corresponding to the set of protection groups.

More specifically, the one or more storage control processors 110 cause power management module to activate specific disk storages in specific storage enclosures.

The method 1300 advances to step 1304.

STEP 1304: Authorizing a Subset of Protection Groups of the Set of Protection Groups to Accept Execution of Disk Operations Thereon At step 1304, the one or more storage control processors 110 authorizes a subset of active protection groups 830 of the set of active protection groups 820 to accept requests to execute write operations. In some non-limiting embodiments of the present technology, the subset of active protection groups 830 includes N−1 protection groups of the set of active protection groups 820. The remaining protection group 840 of the set of active protection groups 820 is configured to be a spare protection group, i.e. it is active and in the set of active protection groups 820 but, does not accept execution of write operations thereon.

The method 1300 advances to step 1306.

STEP 1306: Receiving, by the Storage Processor, at Least One Client Request for Executing at Least One Respective Disk Operation in the Data Storage System At step 1306, the one or more storage control processors 110 receives the at least one client request, i.e. request to execute write operations in the data storage sub-system 120.

The method 1300 advances to step 1308.

STEP 1308: Causing Execution of the at Least One Respective Disk Operation on at Least One Logical Partition Associated with a Given Protection Group of the Set of Protection Groups At step 1308, in some non-limiting embodiments of the present technology, the one or more storage control processors 110 determines respective protection groups in the subset of active protection groups 830 to store the incoming objects 810 based on the respective timestamp of the incoming objects. The one or more storage control processors 110 transmits the incoming objects 810 to the respective protection groups for storing (i.e. executing the write operations). The one or more storage control processors 110 monitors remaining free storage space in each protection group of the subset of active protection groups 830.

The method 1300 advances to step 1310.

STEP 1310: In Response to an Operation Parameter of the Given Protection Group Associated with the at Least One Logical Partition being Equal to a Respective Predetermined Threshold:

authorizing a remaining protection group of the set of protection groups to accept execution of the disk operations, the authorizing including adding the remaining protection group to the subset of protection groups;

activating a new protection group of the plurality of protection groups, the activating the new protection group including adding the new protection group to the set of active protection groups.

At step 1310, the one or more storage control processors 110 monitors remaining free storage space in each of the subset of active protection groups 830. The one or more storage control processors 110 determines that the given protection group 835 of the subset of active protection groups 830 reached its respective storage capacity limit 837. In response to given protection group 835 of the subset of active protection groups 830 reaching its respective storage capacity limit 837, the one or more storage control processors 110 adds the remaining protection group 840 to the subset of active protection groups 830.

The one or more storage control processors 110 determine that one new object is to be stored in the remaining protection group 840 (now part of the subset of active protection groups 830). The remaining protection group 840 starts executing write operations.

In response to the remaining protection group 840 starting execution of the write operations, the one or more storage control processors 110 causes deactivation of the full given protection group 835 and activates a new protection group 850 from the plurality of protection groups 710 which becomes a 'new' remaining protection group 840 of the set of active protection groups 820

Steps 1306 to 1310 are repeated until no protection groups in the plurality of protection groups 710 remain to be added to the set of active protection groups 820.

The method 1300 then ends.

Figure 14:
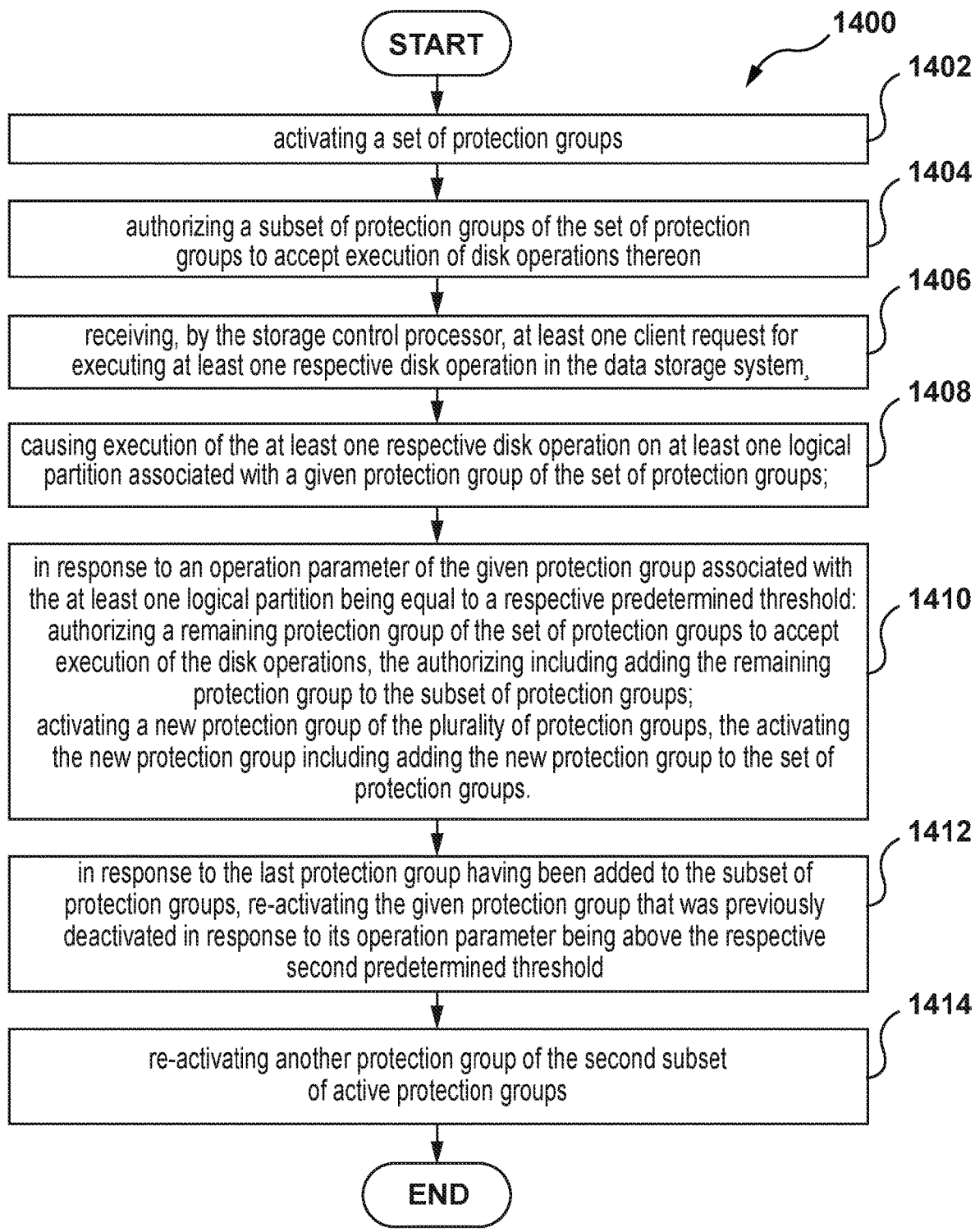
FIG. 14 depicts a flow chart of a method of executing disk operations in the data storage system in accordance with non-limiting embodiments of the present technology

FIG. 14 depicts a flowchart of a method 1400 of executing disk operations in the data storage sub-system 120 in accordance with non-limiting embodiments of the present technology.

The method 1400 is executed by the one or more storage control processors 110. The method 1400 is executed by the one or more storage control processors 110 in instances where the system 100 is configured to avoid situations such that multiples active protections groups become full at a given moment in time.

The method 1400 begins at step 1402.

STEP 1402: Causing Activation of a Set of Protection Groups

At step 1402, the one or more storage control processors 110 causes the power management module 124 to activate a number of N protection groups of the plurality of protections groups to form the second set of active protection groups 920, where each given protection group 925 of the second set of active protection groups 920 has a respective total storage capacity 927.

The method 1400 advances to step 1404.

STEP 1404: Authorizing a Subset of Protection Groups of the Set of Protection Groups to Accept Execution of Disk Operations Thereon At step 1404, the one or more storage control processors 110 authorizes the second subset of active protection groups 930 of the set of active protection groups 920 to accept requests to execute write operations.

In some non-limiting embodiments of the present technology, the second subset of active protection groups 930 includes N−1 protection groups of the set of active protection groups 920. A given protection group 925 of the second subset of active protection groups 930 has the respective second total storage capacity 929. The respective second total storage capacity 929 for the given protection group 925 of the second subset of active protection groups 930 is: a respective total storage capacity 927 multiplied by a ratio of a number m associated with the given protection group 925, and a total number of protection groups N−1 in the second subset of active protection groups 930.

The remaining protection group 940 of the set of active protection groups 920 is configured to be a spare protection group, i.e. it is in the set of active protection groups 920 but, does not accept execution of write operations thereon.

The method 1400 advances to step 1406.

STEP 1406: Receiving, by the Storage Processor, at Least One Client Request for Executing at Least One Respective Disk Operation in the Data Storage System At step 1406, the one or more storage control processors 110 receives incoming objects 905, i.e. request to execute write operations in the data storage sub-system 120.

The method 1400 advances to step 1408.

STEP 1408: Causing Execution of the at Least One Respective Disk Operation on at Least One Logical Partition Associated with a Given Protection Group of the Set of Protection Groups At step 1408, in some non-limiting embodiments of the present technology the one or more storage control processors 110 determines respective protection group to store the incoming objects 905 based on the respective timestamp of the incoming objects.

The method 1400 advances to step 1410.

STEP 1410: In Response to an Operation Parameter of the Given Protection Group Associated with the at Least One Logical Partition being Equal to a Respective Predetermined Threshold:

authorizing a remaining protection group of the set of protection groups to accept execution of the disk operations, the authorizing including adding the remaining protection group to the subset of protection groups;

activating a new protection group of the plurality of protection groups, the activating the new protection group including adding the new protection group to the set of active protection groups.

At step 1410, the one or more storage control processors 110 monitors and determines that a given protection group 925 of the second subset of active protection groups 930 reaches the respective second total storage capacity 929.

The one or more storage control processors 110 replaces the given protection group 925 by the remaining protection group 940 which becomes part of the second subset of active protection groups 930.

The remaining protection group 940 (now in the second subset of active protection groups 930) has as its threshold the respective total storage capacity 927

The power management module 124 deactivates the given protection group 825.

The one or more storage control processors 110 activates a new protection group 950 from the plurality of protection groups 710 thus becoming a new remaining protection group of the set of active protection groups 920

Steps 1406 to 1410 are repeated until there is one last protection group in the plurality of protection groups 710 added to the second subset of active protection groups 930.

STEP 1412: In Response to the Last Protection Group Having been Added to the Subset of Protection Groups, Re-Activating the Given Protection Group that was Previously Deactivated in Response to its Operation Parameter being Above the Respective Second Predetermined Threshold As part of step 1412, which is executed in response to the last protection group having been added to the subset of protection groups, the one or more storage control processors 110 re-activates the given protection group (such as the initial protection group of the second subset of active protection groups) that was previously deactivated in response to its operation parameter being above the respective second predetermined threshold.

It is noted that reactivating the given protection group (such as the initial protection group of the second subset of active protection groups) results in adding the given protection group to the set of active protection groups, which has its threshold as the remainder of its total storage capacity 927.

STEP 1414: Re-Activating Another Protection Group of the Second Subset of Active Protection Groups At step 1414, the one or more storage control processors 110 further reactivates the another protection group of the second subset of active protection groups 930 having reached the respective second total storage capacity 929, and which other protection groups has been previously deactivated in response to its operation parameter being above the respective second threshold.

This reactivation may be implemented in response to another one of the protection group reaching its total storage capacity. The reactivated another protection group becomes the new remaining protection group. It has as its threshold the remainder of its total storage capacity 927

The step 1414 can be repeated until all remaining ones of the second subset of active protection groups 930 that have previously reached the respective second total storage capacity 929 have been reactivated.

It is noted that the step 1414 is repeated for N−2 initial protection groups of the second subset of active protection groups 930 until no available space remain.

The method 1400 then ends.

It should be expressly understood that not all technical effects mentioned herein need to be enjoyed in each and every embodiment of the present technology. For example, embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for managing execution of disk operations in a data storage system, the disk operations including write operations, the data storage system being connected to a storage processor, the storage processor being configured for receiving client requests to execute the disk operations on the data storage system, the data storage system including:
 a power supply module,
 a plurality of storage enclosures connected to the power supply module,
  each storage enclosure of the plurality of storage enclosures including at least one disk storage of a plurality of disk storages,
  the plurality of disk storages being configured to host a plurality of logical partitions,
   each logical partition of the plurality of logical partitions being hosted on a respective set of disk storages, the respective set of disk storages being associated with a respective protection group from a plurality of protection groups,
   each respective protection group being configured to execute the disk operations in response to the respective set of disk storages being active,
 a power management module connected to the power supply module,
  the power management module being configured to cause activation of the respective set of disk storages by selectively causing the power supply module to provide power to an associated storage enclosure, and
 the storage processor,
the method being executable by the storage processor, the method comprising:

causing activation of a set of protection groups, the set of protection groups including a number of N protection groups from the plurality of protection groups;

authorizing a subset of protection groups of the set of protection groups to accept execution of disk operations thereon, the subset of protection groups including a number of N−1 protection groups of the set of protection groups and wherein each protection group in the subset of protection groups is associated with a respective identifier, the respective identifier being a number from 1 to N−1;

receiving, from the storage processor, at least one client request for executing at least one disk operation in the data storage system;

transmitting the at least one disk operation to the subset of protection groups, the transmitting causing execution of the at least one disk operation;

in response to determining that an operation parameter of a given protection group of the subset of protection groups is equal to a first respective predetermined threshold, the operation parameter being an occupied storage space, the first respective predetermined threshold being a storage capacity of given protection group multiplied by a ratio of a number associated with the given protection group to the number of N−1 protection groups in the subset of protections groups:

authorizing a remaining protection group of the set of protection groups to accept execution of disk operations thereon, the authorizing thereby adding the remaining protection group to the subset of protection groups;

causing deactivation of the given protection group, the deactivation of the given protection group thereby removing the given protection group from the set of protection groups;

causing activation of a new protection group of the plurality of protection groups, the activation of the new protection group thereby adding the new protection group to the set of protection groups;

receiving, from the storage processor, at least one second client request for executing at least one second disk operation in the data storage system;

transmitting the at least one second disk operation to the set of protection groups, the transmitting causing execution of the at least one second disk operation;

in response to an operation parameter of another given protection group being equal to the respective predetermined threshold:

authorizing the new protection group of the set of protection groups to accept execution of disk operations, the authorizing thereby adding the new protection group to the subset of protection groups; and causing activation of a second new protection group of the plurality of protection groups, the activation of the second new protection group thereby adding the second new protection group to the set of protection groups;

repeating the receiving, the transmitting, and the determining for a plurality of disk operations until a last protection group of the plurality of protection groups is activated and thereby added to the set of protection groups;

when the last protection group is authorized to accept write operations:

reactivating the given protection group, the given protection group having been previously deactivated in response to its operation parameter being above the first respective predetermined threshold;

in response to determining that an operation parameter of the last protection group is equal to the respective predetermined threshold:

authorizing the given protection group of the set of protection groups to execute disk operations, the authorizing thereby adding the remaining protection group to the subset of protection groups.

2. The method of claim 1, wherein
each disk operation is associated with a respective timestamp;
the method further comprises, prior to the transmitting:
determining, for each disk operation, based on the respective timestamp, a respective protection group identifier associated with the respective protection group for transmitting the disk operation.

3. The method of claim 1, wherein the number of N protection groups in the set of protection groups is constant for a given moment in time.

4. The method of claim 3, wherein
the method is executed such that a total write operations power consumption of the set of protection groups is one of:
equal to a write operations power consumption threshold of the data storage system for the given moment in time, and
below the write operations power consumption threshold of the data storage system for the given moment in time.

5. The method of claim 4, wherein
the data storage system is configured to execute an object-based storage architecture; and wherein
causing execution of a respective write disk operation includes causing storing of a respective object.

6. The method of claim 5, wherein
the storing the respective object comprises:
determining a respective unique object identifier based on the respective timestamp; and wherein
the method further comprises, after causing execution of the at least one respective disk operation on the at least one logical partition associated with the given protection group:
storing the respective unique object identifier.

7. The method of claim 6, further comprising:
receiving a new client request for retrieving a given object, the new client request including the respective unique object identifier of the given object;
determining, based on the respective unique object identifier, a respective protection group storing the given object;
retrieving, from the respective protection group, the given object; and
transmitting the given object.

8. The method of claim 7, wherein the method is executed such that a total read operations power consumption is equal to or below a read operations power consumption threshold of the data storage system.

9. A data storage system connected to a storage processor, the storage processor being configured for receiving client requests to execute disk operations on the data storage system, the disk operations including write operations, the data storage system comprising:
a power supply module;
a plurality of storage enclosures connected to the power supply module;

each storage enclosure of the plurality of storage enclosures including at least one disk storage of a plurality of disk storages,
the plurality of disk storages being configured to host a plurality of logical partitions,
each logical partition of the plurality of logical partitions being hosted on a respective set of disk storages, the respective set of partition disk storages being associated with a respective protection group from a plurality of protection groups,
each respective protection group being configured to execute the disk operations in response to the respective set of disk storages being active,
a power management module connected to the power supply module,
the power management module being configured to cause activation of the respective set of disk storages by selectively causing the power supply module to provide power to an associated storage enclosure; and
the storage processor;
a memory including computer-readable instructions;
the processor, upon executing the instructions, being configured to:
cause activation of a set of protection groups, the set of protection groups including a number of N protection groups from the plurality of protection groups;
authorize a subset of protection groups of the set of protection groups to accept execution of disk operations thereon, the subset of protection groups including a number of N−1 protection groups of the set of protection groups and wherein each protection group in the subset of protection groups is associated with a respective identifier, the respective identifier being a number from 1 to N−1;
receive from the storage processor, at least one client request for executing at least one disk operation in the data storage system;
transmit the at least one disk operation to the subset of protection groups, the transmitting causing execution of the at least one disk operation;
in response to determining that an operation parameter of a given protection group of the subset of protection groups being equal to a first respective predetermined threshold, the operation parameter being an occupied storage space, the first respective predetermined threshold being a storage capacity of given protection group multiplied by a ratio of a number associated with the given protection group to the number of N−1 protection groups in the subset of protections groups:
authorize a remaining protection group of the set of protection groups to accept execution of disk operations thereon, the authorizing thereby adding the remaining protection group to the subset of protection groups;
cause deactivation of the given protection group, the deactivation of the given protection group thereby removing the given protection group from the set of protection groups;
cause activation of a new protection group of the plurality of protection groups, the activation of the new protection group thereby adding the new protection group to the set of protection groups;
receive, from the storage processor, at least one second client request for executing at least one second disk operation in the data storage system;
transmit the at least one second disk operation to the set of protection groups, the transmitting causing execution of the at least one second disk operation;
in response to an operation parameter of another given protection group being equal to the respective predetermined threshold:
authorize the new protection group of the set of protection groups to accept execution of disk operations, the authorizing thereby adding the new protection group to the subset of protection groups; and
cause activation of a second new protection group of the plurality of protection groups, the activation of the second new protection group thereby adding the second new protection group to the set of protection groups;
repeat the receiving, the transmitting, and the determining for a plurality of disk operations until a last protection group of the plurality of protection groups is activated and thereby added to the set of protection groups;
when the last protection group is authorized to accept write operations: reactivate the given protection group, the given protection group having been previously deactivated in response to its operation parameter being above the first respective predetermined threshold;
in response to determining that an operation parameter of the last protection group is equal to the respective predetermined threshold:
authorize the given protection group of the set of protection groups to execute disk operations, the authorizing thereby adding the remaining protection group to the subset of protection groups.

* * * * *